US011465619B2

(12) United States Patent
Silva et al.

(10) Patent No.: US 11,465,619 B2
(45) Date of Patent: Oct. 11, 2022

(54) VEHICLE COLLISION AVOIDANCE BASED ON PERTURBED OBJECT TRAJECTORIES

(71) Applicant: Zoox, Inc., Foster City, CA (US)

(72) Inventors: William Anthony Silva, San Francisco, CA (US); Abishek Krishna Akella, Pleasanton, CA (US)

(73) Assignee: Zoox, Inc., Foster City, CA (US)

( * ) Notice: Subject to any disclaimer, the term of this patent is extended or adjusted under 35 U.S.C. 154(b) by 202 days.

(21) Appl. No.: 16/884,975

(22) Filed: May 27, 2020

(65) Prior Publication Data
US 2021/0370921 A1     Dec. 2, 2021

(51) Int. Cl.
*B60W 30/09* (2012.01)
*B60W 60/00* (2020.01)
*B60W 30/095* (2012.01)

(52) U.S. Cl.
CPC ........ *B60W 30/09* (2013.01); *B60W 30/0956* (2013.01); *B60W 60/0016* (2020.02); *B60W 60/0027* (2020.02); *B60W 2554/404* (2020.02)

(58) Field of Classification Search
CPC ............. B60W 30/09; B60W 30/0956; B60W 60/0016; B60W 60/0027; B60W 2554/404; B60W 30/08; B60W 30/095; B60W 30/0953; B60W 2540/18; G01S 13/931; G01S 2013/9318; G01S 2013/9319; G01S 2013/932; G01S 15/93; G01S 15/931; G05D 1/0212; G05D 1/0214; G05D 1/0289; G08G 1/16; G08G 1/166; B60T 8/17558; B60T 2201/022; B25J 9/1666; B25J 9/1676
See application file for complete search history.

(56) References Cited

U.S. PATENT DOCUMENTS

| | | | |
|---|---|---|---|
| 8,473,144 B1 | 6/2013 | Dolgov et al. | |
| 10,949,885 B2 * | 3/2021 | Xiao | B60W 30/08 |
| 2017/0120804 A1 | 5/2017 | Kentley et al. | |
| 2019/0025841 A1 | 1/2019 | Haynes et al. | |
| 2019/0061712 A1 | 2/2019 | Melik-Barkhudarov et al. | |
| 2019/0066506 A1 | 2/2019 | Kazemi et al. | |
| 2019/0243371 A1 * | 8/2019 | Nister | G05D 1/0891 |

(Continued)

OTHER PUBLICATIONS

International Search Report and Written Opinion for PCT App. No. PCT/US21/33931, dated Sep. 9, 2021.

*Primary Examiner* — Abby Y Lin
*Assistant Examiner* — Esvinder Singh
(74) *Attorney, Agent, or Firm* — Lee & Hayes, P.C.

(57) ABSTRACT

A vehicle safety system within an autonomous or semi-autonomous vehicle may predict and avoid collisions between the vehicle and other moving objects in the environment. The vehicle safety system may determine one or more perturbed trajectories for another object in the environment, for example, by perturbing the state parameters of a perceived trajectory associated with the object. Each perturbed trajectory may be evaluated to determine whether it intersects or potentially collides the planned trajectory of the vehicle. In some examples, the vehicle safety system may aggregate the results of analyses of multiple perturbed trajectories to determine a collision probability and/or additional weights or adjustment factors associated with the collision prediction, and may determine actions for the vehicle to take based on the collision predictions and probabilities.

20 Claims, 9 Drawing Sheets

(56) References Cited

U.S. PATENT DOCUMENTS

2020/0180648 A1* 6/2020 Lan ..................... G08G 1/166
2020/0339116 A1* 10/2020 Xu ................. B60W 30/18145
2020/0385020 A1* 12/2020 Komuro ........... B60W 60/0017
2021/0001860 A1* 1/2021 Kawasaki ............. B60W 50/14
2021/0354729 A1* 11/2021 Ng .................... B60W 60/0018

* cited by examiner

700

Acceleration (a)

| Steering Angle Rate (s) | | a-3p | a-2p | a-p | a | a+1p | a+2p | a+3p |
|---|---|---|---|---|---|---|---|---|
| | s-3q | Y | Y | Y | Y | Y | Y | Y |
| | s-2q | Y | Y | Y | Y | N | N | N |
| | s-q | Y | Y | N | N | N | N | N |
| | s | Y | Y | N | N | N | N | N |
| | s+q | Y | N | N | N | N | N | N |
| | s+2q | Y | N | N | N | N | N | N |
| | s+3q | N | N | N | N | N | N | N |

FIG. 7

VEHICLE COLLISION AVOIDANCE BASED ON PERTURBED OBJECT TRAJECTORIES

BACKGROUND

Vehicles may be equipped with collision avoidance systems used to detect objects in an environment and control the vehicle to avoid the objects. Collision avoidance systems may detect both stationary objects such as parked vehicles and road obstructions, and moving objects such as other vehicles, cyclists, pedestrians, and animals. For example, some collision avoidance systems operate by detecting and identifying the presence of a surface in the environment representing an object in the path of the vehicle, and then engaging the braking and/or steering systems of the vehicle to avoid colliding with the surface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is a chart illustrating the determinations of collision predictions between an object and vehicle for a matrix of perturbed trajectories, in accordance with certain techniques described herein.

DETAILED DESCRIPTION

Figure 1:
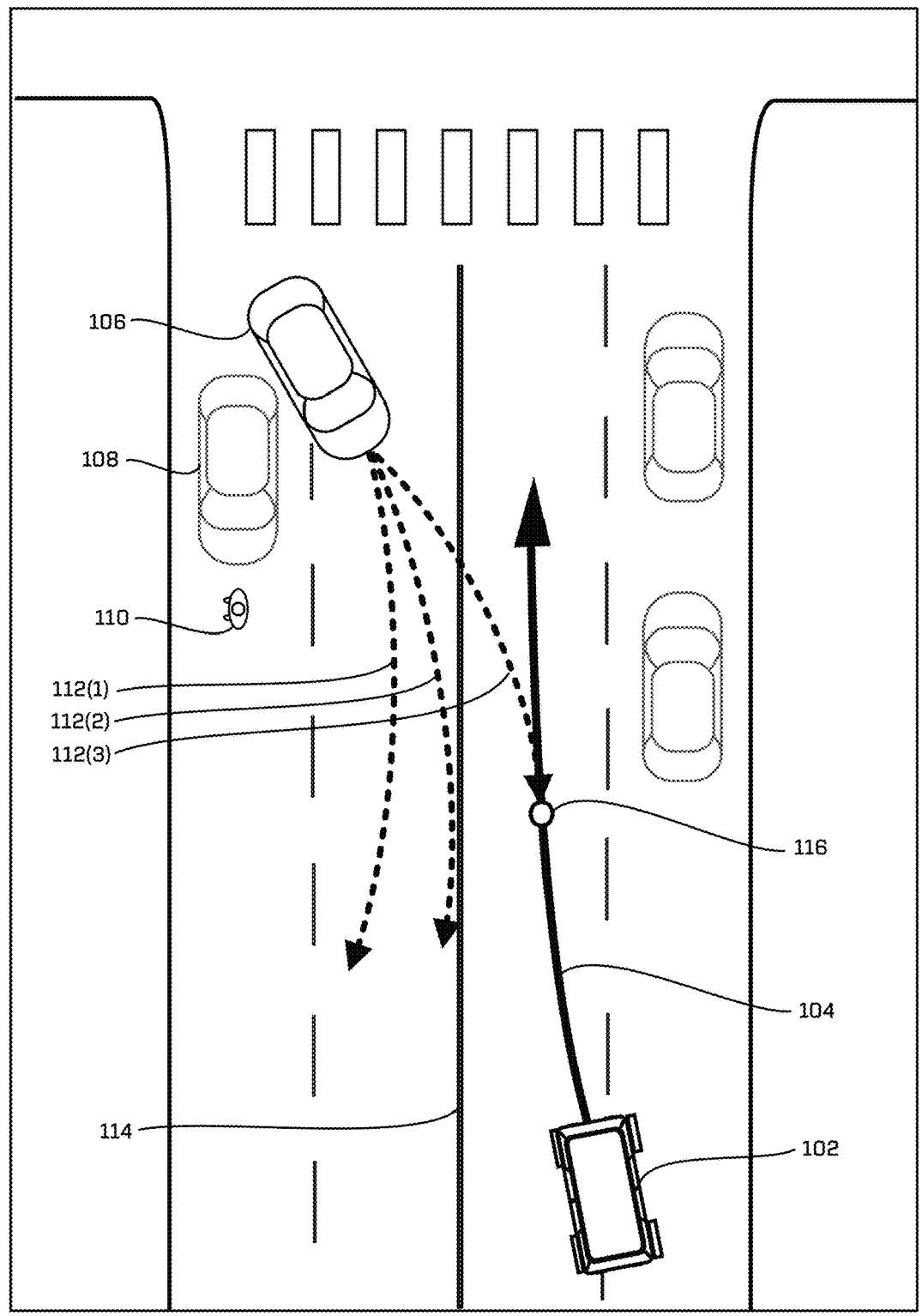
FIG. 1 illustrates a vehicle traversing an environment, and depicts the vehicle trajectory and multiple perturbed trajectories for a second vehicle in the environment.

This disclosure describes techniques for improving collision prediction and avoidance between a vehicle traversing an environment and other moving objects within the environment. The vehicle may include an autonomous, semi-autonomous, or manually controlled vehicle, and the moving objects may include other vehicles (e.g., cars, trucks, motorcycles, mopeds, etc.), pedestrians, bicyclists, animals, or the like. A vehicle safety system within the vehicle may identify other objects within the environment, determine one or more perturbed trajectories for the other objects, and then predict potential collisions by determining intersections between the vehicle trajectory and the perturbed trajectories (or candidate trajectories) for the objects. For instance, the vehicle safety system may compare the trajectory (or planned path) for the vehicle to multiple possible perturbed trajectories for another object moving within the environment. To determine the perturbed trajectories for an object, the vehicle safety system may modify (or perturb) one or more parameters of the current (or perceived) trajectory of the object, such as the velocity, acceleration, and/or steering angle rate. For a perturbed trajectory or multiple perturbed trajectories, the vehicle safety system may determine whether the perturbed trajectories intersect the planned trajectory for the vehicle. If one or more perturbed trajectories intersect the planned vehicle trajectory, then the vehicle safety system may predict that a potential collision is possible between the vehicle and the object, and may determine an action for the vehicle to take based on the potential collision prediction.

In various exampled described herein, the vehicle safety system may receive state data associated with one or more objects moving within the same environment as the vehicle. The state data for the object may be based on sensor data captured by a sensor system on the vehicle, and may include the classification of the object and the perceived state of the object (e.g., current perceived velocity of the object, current perceived yaw rate of the object, current perceived linear and/or angular acceleration of the object, etc.). In some cases, the vehicle safety system may receive the state data from another system within the vehicle, such as a separate sensor system, a perception system, and/or the main vehicle control system of the vehicle. Additionally or alternatively, the vehicle safety system may determine object data directly using raw sensor data from the one or more sensors (e.g., LIDAR, RADAR, etc.), and may use the sensor data to determine the perceived state parameters for the object (e.g., velocity, acceleration, steering angle rate, etc.).

Using the current (or perceived) state parameters for the object, the vehicle safety system may determine a number of perturbed trajectories for the object. Each perturbed trajectory may represent one possible trajectory along which the object can move from its current perceived position. For instance, the current perceived position and state parameters for an object may correspond to a first time ($t_0$), and each perturbed trajectory may include a path with a series of points at subsequent times ($t_1$, $t_2$, $t_3$, etc.) leading away from the position of the object at the time to. Each perturbed trajectory determined by the vehicle safety system for the object may be based on a different combination of state parameters, which are modified from the current state parameters for the object. For example, to determine a single perturbed trajectory for the object, the vehicle safety system may use one or more perturbation parameters to modify the perceived acceleration of the object, the perceived steering angle rate of the object, or both. To determine multiple perturbed trajectories, the vehicle safety system may use different combinations of perturbation parameters, include different magnitudes of positive and/or negative perturbation parameters. In at least some examples, such modifications and perturbations may be minimized such that the parameter space around the most likely trajectories, most extreme trajectories, dynamically or kinematically limited trajectories, or otherwise are perturbed so as to minimize the computational resources necessary while still ensuring that every possible scenario of interactions is accounted for.

The vehicle safety system may analyze a perturbed trajectory for an object by comparing the perturbed trajectory to the planned trajectory for the vehicle, and determine whether the trajectories intersect. In some examples, the vehicle safety system may determine projected regions, including bounding boxes, path polygons (or corridors), etc. for the vehicle and the object based on the vehicle trajectory and the perturbed trajectory of the object to determine if a time-space overlap occurs between the vehicles following their respective trajectories. The intersection between the trajectories may represent a potential collision, and the vehicle safety system may analyze the overlap detected between regions (e.g., bounding boxes or corridors) at different time intervals based on the vehicle and object trajectories to determine a likelihood of a potential collision between the vehicle and each perturbed trajectory of the object. Additional examples of techniques to control a vehicle and avoid collisions between the vehicle and other moving objects in an environment can be found, for example, in U.S. patent application Ser. No. 16/136,038, entitled "Collision Prediction and Avoidance for Vehicles" filed Sep. 19, 2018, the entirety of which is incorporated herein by reference for all purposes.

In some examples, the vehicle safety system may determine a collision prediction based on the vehicle trajectory and a single perturbed trajectory of the object. For an individual perturbed trajectory, the collision prediction may be a binary determination (e.g., intersection or non-intersection, collision or no collision). In other examples, the vehicle safety system may determine and analyze multiple perturbed trajectories of the object, and may determine a single collision prediction based on the results from the multiple perturbed trajectories. In such examples, the collision prediction may be calculated as a ratio and/or probability of a collision occurring, based on the results from the individual perturbed trajectories. The vehicle safety system then may determine one or more actions for the vehicle to take, based on the collision prediction. Such actions may include activating automated braking and/or steering functions of the vehicle (and/or other vehicle control systems) to avoid or mitigate the risk of a potential collision.

The techniques and systems described herein may improve the operation and functioning of autonomous or semi-autonomous vehicles, by more accurately predicting and avoiding potential collisions with other objects moving in the environment. For example, systems that predict collisions based on straight-line trajectories and/or based on trajectories that assume constant velocities, accelerations, and steering angle rates for the objects in the environment may not account for potential changes in trajectory by dynamic objects. For instance, dynamic objects such as vehicles driven by human agents or controlled by intelligent software-based agents often do not follow a single trajectory, but may vary their velocities, accelerations, and steering angle rates in response to other objects in the environment, traffic or weather conditions, or for purposes of navigation or route optimization, etc. Systems that assume that dynamic objects will proceed along on a constant trajectory with unchanging motion parameters (e.g., constant velocity, acceleration, and/or steering angle rate, etc.) may fail to accurately predict potential collisions with the objects. By failing to predict the trajectory perturbations that may be performed by dynamic objects, such systems may inaccurately predict collisions when collisions will not occur, causing the unnecessary triggering of anti-collision actions, and may fail to predict collisions when collisions will occur, resulting in more severe and dangerous collisions.

To address these problems, the techniques and systems described herein include improved vehicle-based collision predictions by determining perturbed trajectories for objects in the environment based on trajectories perturbations (or modifications) and analyzing/evaluating the perturbed trajectories to better predict potential collisions between the vehicle and the objects. Some techniques include using a probabilistic approach to predicting collisions, in which the vehicle safety system determines multiple perturbed trajectories for a moving object in the environment, evaluates the individual perturbed trajectories, and aggregates the results to calculate the overall probability of a collision occurring. For instance, the vehicle safety system may determine a first number of perturbed trajectories that will cause the object to collide with the vehicle, and a second number of perturbed trajectories will cause the object not to collide with vehicle. The vehicle safety system then may calculate the probability of a collision based on the ratio of the first and second numbers. After calculating the collision probability, the vehicle safety system may compare the probability to one or more threshold ranges to determine actions for the vehicle to take to avoid or mitigate the potential collision.

As noted above, the vehicle safety system may determine a set of perturbed trajectories by perturbing the state parameters of the perceived trajectory of the object. Using one or more perturbation parameters, the vehicle safety system may determine perturbed (or modified) state parameters, including one or more perturbed velocities, accelerations, yaw rates, and/or steering angle rates (or angular accelerations). Each set of perturbed state parameters may correspond to a perturbed trajectory for the object. In some examples, the vehicle safety system may use a first perturbation parameter to generate a set of modified acceleration (e.g., linear acceleration) values for the object, and a second perturbation parameter to generate a set of modified steering angle rates (or angular acceleration) values for the object. In some cases, the set of perturbed (or modified) state parameters for the object may be calculated by modifying the perceived state parameters perceived of the object, based on plus or minus factor of the perturbation parameter. For instance, a set of perturbed (or modified) linear acceleration parameters for an object may include the perceived linear acceleration of the object+/−a linear acceleration perturbation parameter, the perceived linear acceleration+/−two times the linear acceleration perturbation parameter, and so on. Similarly, a set of perturbed steering angle rates for the object may be generated based on the current (or perceived) steering angle rate of the object, perturbed by positive and negative factors a steering angle rate perturbation parameter. The vehicle safety system then may determine a set of perturbed trajectories for the object, including a perturbed trajectory for each unique combination of perturbed accelerations and perturbed steering angle rates.

In some examples, the perturbation parameters used to determine the sets of perturbed (or modified) state parameters (e.g., perturbed velocities, perturbed accelerations, perturbed steering rates, etc.) may be based on the classification of the object. For instance, the vehicle safety system may receive the object classification with the state data or may determine a classification for the object based on perception or sensor data and may different perturbation parameters for different types of vehicles (e.g., cars, trucks, motorcycles, etc.) and/or for various other object types (e.g., bicycles, animals, pedestrians, etc.). For example, the perturbation parameter values, as well as the number and/or range of perturbed trajectories generated for an object may be based on the kinematic and/or dynamic constraints and capabilities associated with the type/classification of the object. For instance, for a given perceived trajectory of an object in an environment, the vehicle safety system may generate one set of perturbed trajectories if the object is a bicycle, based on the kinematic and/or dynamic constraints of bicycles, and a different set of perturbed trajectories if the object is a car, based on the different kinematic and/or dynamic constraints of cars, and so on. Additionally, although the above example refers to determining perturbed trajectories by perturbing the perceived acceleration and the perceived steering angle rate of the object, in other examples the vehicle safety system may determine different perturbed trajectories based on perturbations of other state parameters, such as perturbed object velocities, perturbed object yaw rates, etc.

Additionally, in some implementations, the vehicle safety system may determine a probability associated with each perturbed trajectory. In contrast to the overall collision probability calculations discussed above, a trajectory probability for a perturbed trajectory refers to the probability that the object will follow the perturbed trajectory. For instance, if the vehicle safety system determines N different perturbed trajectories for an object, it may determine by default that each perturbed trajectory has an equal chance (e.g., 1/N) of being followed by the object. However, in other examples, the vehicle safety system may determine that some perturbed trajectories are more likely to be followed by the object than others, and may assign different probabilities to the different perturbed trajectories. In such examples, the vehicle safety system may use the different probabilities to weight the results of the evaluations of the perturbed trajectories, thereby weighting the overall collision probability calculation in favor of the more likely perturbed trajectories and against the less likely perturbed trajectories.

In certain examples, the calculation of the collision probability between the vehicle and an object also may be weighted and/or adjusted based on additional factors, such as the predicted severity of the potential collision, the physical closeness of a predicted non-collision (e.g., predicted near misses), and the consistency and reliability of the state data or sensor data associated with the object. The vehicle safety system may determine and use each of these factors as described herein to weight and/or adjust the calculations of collision predictions between the vehicle and the object. For instance, the vehicle safety system may weight potential collisions that are predicted to be severe more than less severe collisions. The vehicle safety system also may adjust the collision probability to account for near miss perturbed trajectories and/or to account for less reliable or inconsistent state data and/or state parameters associated with the object.

As illustrated by these examples, the techniques and systems described herein may improve the operation and functioning of autonomous and semi-autonomous vehicles by more accurately predicting and avoiding potential collisions with other moving objects in an environment. Using the predictive approaches described herein, including determining and evaluating multiple perturbed trajectories for an object, a vehicle safety system may predict potential collisions with objects more accurately and comprehensively. In contrast to systems that assume that objects will continue along their current course or trajectory, the techniques described herein including calculating a collision probability based on different perturbed trajectories for an object, which may reduce inaccurate predictions of collisions and inaccurate predictions of non-collisions caused by assuming that dynamic objects will follow constant trajectories.

Further, the techniques and systems described herein also may improve the operation and functioning of vehicles with respect to determining actions for the vehicle to take in response to predicted collisions. When using a probabilistic approach for predicting collisions based on multiple perturbed trajectories, the vehicle safety system need not make a binary choice of performing or not performing a single action. Instead, the vehicle safety system may initiate any of several different actions based on different collision probability thresholds and ranges. Additionally, the techniques described herein further allow the vehicle safety system to determine the actions for the vehicle to take based on the collision probability calculation in combination with additional factors, such as the confidence level in the collision probability calculation and the predicted severity of the potential collision. The vehicle safety system thus may perform a wider range of possible actions based on the collision probability and related factors, to improve the operation of the vehicle in avoiding and/or mitigating potential collisions.

FIG. 1 illustrates a vehicle 102 traversing an environment 100 that includes various additional vehicles and other objects. A vehicle trajectory 104 (which also may be referred to as a path or planned path) is illustrated for the vehicle 102, indicating that the vehicle 102 is the process of changing lanes. Environment 100 also includes a number of other vehicles and other objects, including a second vehicle 106 proceeding in the opposite direction from vehicle 102. In this example, the second vehicle 106 is shown in the process of quickly changing lanes (or swerving) to avoid a third vehicle 108 which has slowed down because of a pedestrian 110 crossing the road. From the perspective of the vehicle 106, it is moving in a right-to-left direction on the road but also has a left-to-right steering angle, indicating that vehicle 106 is in the process of returning to a straighter trajectory with respect to its direction of travel.

Three different perturbed trajectories 112 are also shown for vehicle 106, representing three potential paths along which vehicle 106 may drive in the period of time following the scene depicted in FIG. 1. The perturbed trajectories 112(1), 112(2), and 112(3) in this example vary with respect to the steering angle rate (e.g., angular velocity and/or acceleration) at which the vehicle 106 will travel from its location as depicted in FIG. 1. Perturbed trajectory 112(1) depicts the sharpest steering angle rate for the vehicle 106, in which the vehicle 106 does not closely approach or cross the centerline 114 of the road. Perturbed trajectory 112(2) depicts a wider (or less sharp) steering angle rate for the vehicle 106, in which the vehicle 106 closely approaches but does not cross the centerline 114. Perturbed trajectory 112(3) depicts an even wider steering angle rate for the vehicle 106, which causes the vehicle 106 to cross the centerline 114 and intersect with the trajectory 104 for the vehicle 102 at point 116.

In some implementations, vehicle 102 may comprise a vehicle safety system including various components configured to perform various collision prediction and avoidance techniques described herein. As will be described in further detail with regard to FIG. 5, the vehicle safety system 534 may be implemented as a separate and/or independent system (e.g., separate computing device(s)) operating within a vehicle 102. In other examples, the collision prediction and avoidance techniques described herein may be implemented by other vehicle systems, components, and/or computing devices. For instance, certain techniques described herein may be implemented at least partially by or in association with a planning component 524 and/or a prediction component 526.

As described further below, the vehicle 102 may include sensor system(s) including sensors configured to detect and identify objects within the environment 100. In various examples, vehicle 102 also may receive and use sensor data from remote sensors, such as sensors operating on another vehicle and/or sensors mounted and operating elsewhere in the environment 100 (e.g., traffic monitoring cameras). The vehicle safety system may receive state data (also referred to as perception data) based on the sensor data captured by various systems within the vehicle 102 or external to the vehicle 102. The state data may identify a number of objects detected in the environment 100, and may include various object attributes such as object classification, size, position, pose, orientation, and state parameters for the object (e.g., velocity, yaw rate, linear acceleration, angular acceleration, etc.). Additionally or alternatively, the vehicle safety system may include one or more dedicated sensors configured to detect objects within the environment 100 in the proximity of the vehicle 102. Such sensor(s) may include sensors mounted on the vehicle 102, such as cameras, motion detectors, LIDAR, RADAR, etc.

Although three perturbed trajectories 112 are shown in this example, the vehicle safety system may determine any number of different trajectories in other examples. Additionally, in this example the perturbed trajectories 112 have been determined by varying the steering angle rate of the vehicle 106. However, in other examples the vehicle safety system may vary any other state parameters (e.g., velocity, yaw rate, linear acceleration, angular acceleration, etc.), individually or in any combination, to determine the set of perturbed trajectories 112.

Additionally, although this example depicts the perturbed trajectories 112 for a single object (e.g., vehicle 106), in other examples the vehicle safety system of the vehicle 102 may determine set of perturbed trajectories for multiple objects in the environment. For instance, the vehicle 102 may determine perturbed trajectories for vehicle 106, vehicle 108, pedestrian 110, and/or other moving objects in the environment 100. In some examples, the vehicle safety system may analyze the state data to determine which objects in the proximity of the vehicle 102 are moving and which are not moving. The vehicle safety system then may determine perturbed trajectories for moving objects (e.g., cars, trucks, motorcycles, etc.), pedestrians, bicyclists, animals, and moving road obstructions such as tumbleweeds and debris, etc., but need not determine perturbed trajectories for the non-moving objects (e.g., trees, parked vehicles, etc.). In some implementations, the vehicle safety system may perform standard collision avoidance operations for non-moving objects, but may disregard non-moving objects when determining perturbed trajectories and collision probability calculations.

In some examples, the vehicle safety system may determine perturbed trajectories for moving objects within a proximity range of the vehicle 102, but not for objects outside the proximity range. In some instances, the proximity range may be a distance range (e.g., 50 m, 100 m, 200 m, etc.) and/or a time range (e.g., 2 secs, 3 secs, . . . , 6 secs, . . . , 10 secs, etc.) corresponding to the time at which the vehicle 102 and object 106 could potentially intersect. In such instances, the vehicle safety system may compare the locations and/or speeds of the vehicle 102 and the vehicle 106, to determine whether or not vehicle 106 is sufficiently close to determine perturbed trajectories for the vehicle 106. In other examples, the vehicle safety system may determine the proximity range on-the-fly based on the estimated stopping distance of the vehicle 102 and/or the other objects in the environment 100. In such cases, the vehicle safety system may receive or determine various attributes such as the object classification, weight, current speed, braking system specifications, etc., for the vehicle 102 and/or for other objects in the environment 100 (e.g., vehicle 106). The vehicle safety system may use the object attributes and other data (e.g., weather, road conditions, etc.) to determine the estimated stopping distances for the vehicle 102 and/or vehicle 106, and may use the estimated stopping distance(s) to determine whether or not vehicle 106 is sufficiently close to determine perturbed trajectories for vehicle 106.

As noted above, FIG. 1 depicts an intersection point 116 between the vehicle trajectory 104 and a perturbed trajectory 112(3) for the vehicle 106. To determine an intersection between a vehicle trajectory and perturbed trajectory of an object, such a system may compare the generated trajectory paths and/or coordinate sets, and may compare the trajectories within a common coordinate system to detect any overlapping points. Although the example of FIG. 1 depicts the trajectories 104 and 112(3) as lines and depicts intersection point 116 as a single point, in other examples the vehicle safety system may determine vehicle/object trajectories as two-dimensional or three-dimensional polygonal objects having a projected path of movement through the environment 100. For instance, the vehicle safety system may determine a bounding box for the vehicle and the other object(s) in the environment 100 based on the respective sizes and shapes of the vehicle and object(s). The vehicle safety system may project the movement of bounding boxes through a virtual coordinate system based on the environment 100, including changing the angles of the bounding boxes based on the orientation of the vehicles/objects and/or applying optional safety buffers around the bounding boxes. In such examples, when the determined trajectories for the vehicles/objects intersect, the vehicle safety system may define the intersection as polygonal collision zone based on the projected movements of the bounding boxes representing the vehicles and objects in the virtual coordinate system. As discussed below, the vehicle safety system then may determine an amount of time-space overlap between the vehicle 102 and object(s) in the collision zone, based on the entry and exits times of the vehicle and object(s) in the collision zone, to predict a potential collision.

Figure 2A:
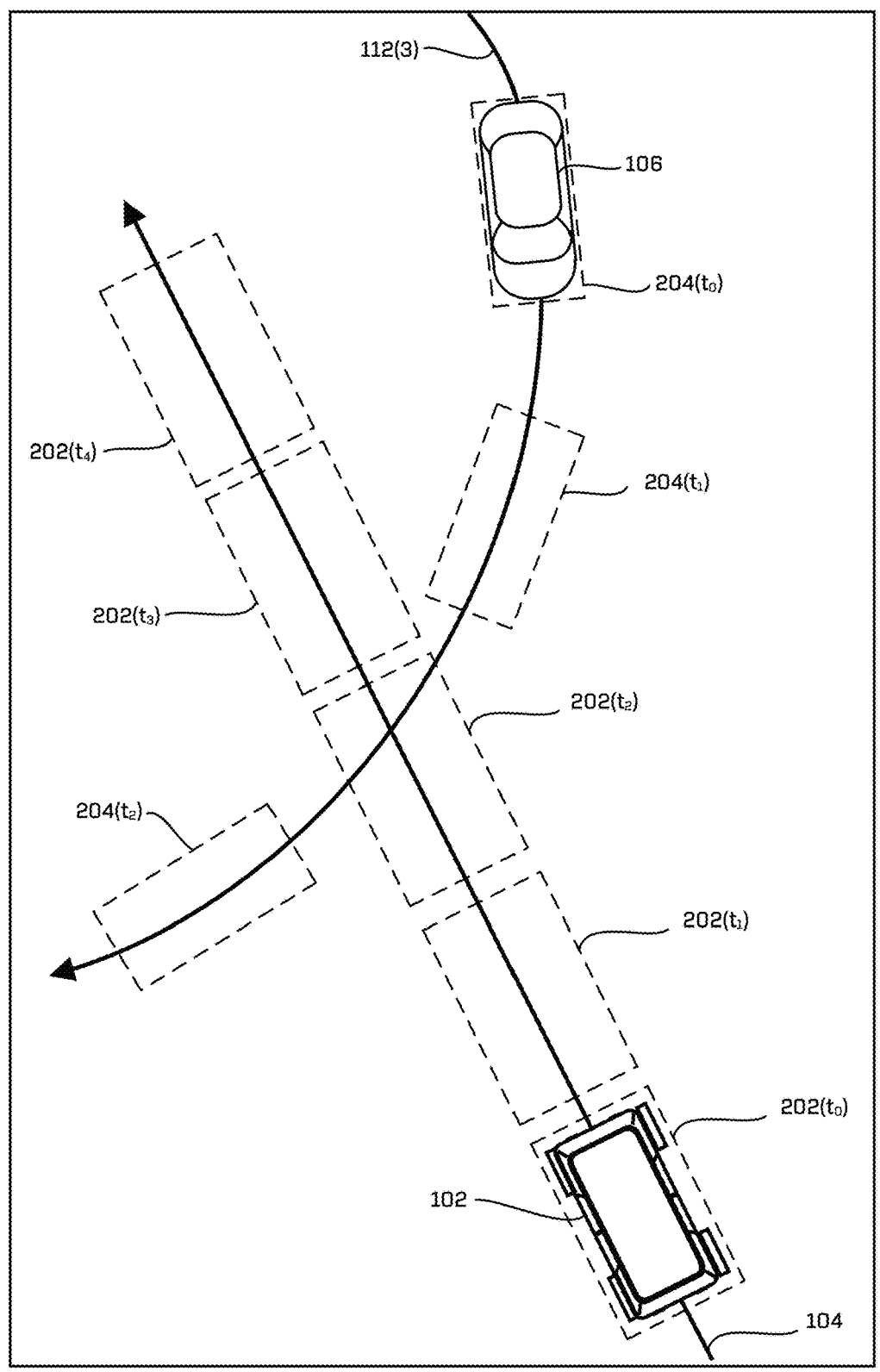
FIGS. 2A and 2B illustrate a vehicle and a second vehicle traversing an environment, and depicts a potential collision between the vehicles.
Figure 2B:
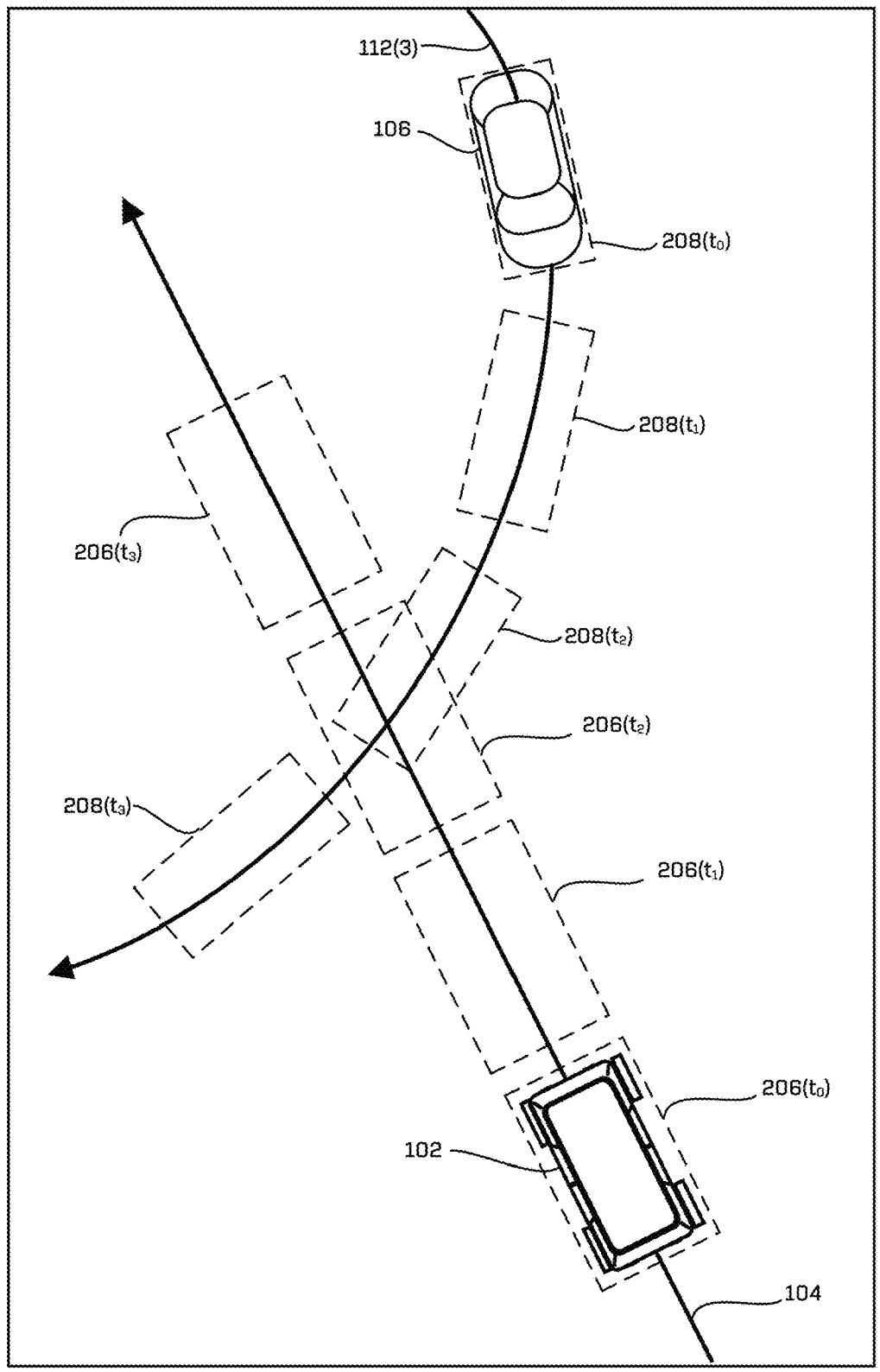

FIGS. 2A and 2B respectively illustrate environments 200A and 200B, which may be similar or identical to environment 100, in which a vehicle safety system of a vehicle 102 may determine a potential collision based on the trajectory 104 of the vehicle 102 and a perturbed trajectory 112(3) of an object such as vehicle 106.

In some examples, the vehicle safety system may determine sizes and/or spatial regions associated with the vehicle 102 and the object vehicle 106, and may use the sizes or regions along with the vehicle trajectories to determine the possibility or likelihood of a potential collision between the vehicles 102 and 106. As shown in FIG. 2A, in some examples the vehicle safety system may determine a bounding box 202 associated with the vehicle 102, and a bounding box 204 associated with the object vehicle 106. The bounding boxes 202 and 204 may be based on the dimensions (e.g., length, width, and height) and the shape of the respective vehicles, including a safety buffer representative of a safe distance around the vehicles 102 and 106 to avoid a collision. For instance, the vehicle safety system may determine the dimension of the bounding box 204 for the object vehicle 106 based on the perceived edges (frontmost and backmost points, leftmost and rightmost points) of the vehicle 106 along its perceived trajectory, including an additional safety buffer around the perceived edges of the vehicle 106. In various examples, the size and shape of safety buffers used for the bounding boxes 202 and 204 may depend on the size, speed, type, or other characteristics of the vehicles 102 and 106. For instance, a larger safety buffer may be used for higher-speed vehicles, more vulnerable vehicles/objects (e.g., bicycles or pedestrians), or for scenarios in which the vehicle safety system has less confidence in the perception data for the size, shape, trajectory or other state parameters of the object vehicle 106.

In FIG. 2A, the respective bounding boxes 202 and 204 for the vehicles 102 and 106 are shown at a first (current) time to, and then as projections at multiple different time intervals subsequent to the current time. In this example, a first bounding box $202(t_0)$ is shown for the vehicle 102 at the current time, and a series of projected bounding boxes $202(t_1)$, $202(t_2)$, $202(t_3)$, and $202(t_4)$, are shown at regular time intervals moving forward from the current time, based on the planned trajectory of the vehicle 102. Similarly, a first bounding box $204(t_0)$ is shown based on the perceived state of the vehicle 106 at the current time, and a series of projected bounding boxes $204(t_1)$ and $204(t_2)$ are shown at the same time intervals ($t_1$ and $t_2$) based on perturbed trajectory 112(3) of the object vehicle 106. As shown in this example, the vehicle safety system also may account for the anticipated vehicle maneuvers (e.g., turns) and the corresponding effect on the orientation and position of the vehicles 102 and 106, when calculating the projected regions for bounding boxes 202 and 204 at the subsequent time intervals.

In some examples, the vehicle safety system may compare the regions associated with bounding boxes 202 and 204 at each time interval to determine whether or not any overlap exists, which may indicate an intersection or potential collision between the vehicles 102 and 106. For instance, the vehicle safety system may compare the size, shape, and location of bounding boxes $202(t_1)$ and $204(t_1)$ to determine if overlap exists at time $t_1$, similarly compare bounding boxes $202(t_2)$ and $204(t_2)$ to determine if overlap exists at time $t_2$, and so on. As shown in FIG. 2A, there is no overlap between bounding boxes 202 and 204 at any time interval, and thus the vehicle safety system may determine that there is no intersection and/or that a potential collision is not likely between vehicles 102 and 106.

In contrast, in FIG. 2B, the vehicle safety system has determined a first series of projected bounding boxes $206(t_1)$, $206(t_2)$, and $206(t_3)$ based on the planned trajectory 104 of the vehicle 102, and a second series of projected bounding boxes $208(t_1)$, $208(t_2)$, and $208(t_3)$ based on the perturbed trajectory 112(3) of the object vehicle 106. As shown in this example, an overlap exists between bounding boxes $206(t_2)$ and $208(t_2)$, indicating that a potential collision may occur between vehicles 102 and 106 at or near time $t_2$.

Although the above example describes determining potential collisions by projecting bounding boxes at discreet time intervals, the vehicle safety system may implement various other techniques in other examples. For instance, in some cases the vehicle system safety may determine a projected path polygon or freeform corridor for each vehicle 102 and 106 based on their respective trajectories 104 and 112(3), and may perform a time-space overlap analysis within a potential collision zone determined based on the overlap of the path polygons (or corridors). For example, as described in more detail in U.S. patent application Ser. No. 16/136,038, entitled "Collision Prediction and Avoidance for Vehicles" filed Sep. 19, 2018, the entirety of which is incorporated herein by reference for all purposes, a potential collision zone between vehicles 102 and 106 may be based on the point(s) of intersection between trajectory 104 and trajectory 112(3), and one or more offset distances associated with vehicles 102 and 106. The vehicle safety system may determine the offset distances based on the lengths and/or widths of the vehicles 102 and 106 and also may apply a safety buffer or any other distance representative of a safe distance from the object (e.g., vehicle 106) at which the vehicle 102 will not collide. For instance, the vehicle safety system may calculate the offset distance(s) used to define the dimensions of potential collision zone, based on overlap of the projected movement corridor for vehicle 102 and the projected movement corridor for vehicle 106, wherein the measurements are performed for points before and after the intersection point 116 of the trajectories 104 and 112(3). In various examples, the sizes of the movement corridors may be measured from the center of the vehicles 102 and 106 and/or from the frontmost and backmost point of the vehicles 102 and 106 along their trajectories. The vehicle safety system also may account for vehicle maneuvers (e.g., turns) and the corresponding effect on the position of the vehicle, when calculating the offset distances for the potential collision zone.

The vehicle safety system also may determine entry and exit points and times for the vehicles 102 and 106, corresponding to the first and last points of overlap between the bounding boxes for the vehicles and the potential collision zone. For example, vehicle 102 may have an entry point into a potential collision zone and an exit point out of the potential collision zone, and vehicle 106 may have separate entry and exit points and respectively. In some examples, the vehicle trajectory 104 and/or perturbed trajectory 112(3) may be defined as a series of trajectory sample points. In such examples, the vehicle safety system may determine the entry and exit points for the vehicle 102 and vehicle 106 by identifying the last trajectory sample point prior to intersecting the boundary of the potential collision zone, and the first trajectory sample point after intersecting the boundary of the potential collision zone.

The offset distance(s) defining the dimensions of the potential collision zone may be determined by the vehicle safety system based on predefined distances (e.g., constant values), for example, known or perceived lengths and widths of vehicles 102 and 106, and/or buffer values. In some cases, the vehicle safety system may determine offset distances, with respect to vehicle trajectories 104 and 112(3), before the intersection point 116, which may be the same or different distances as those determined based on the trajectories 104 and 112(3) after the intersection point 116. By way of illustration, the entry point for vehicle 102 may represent a position with a 10-foot offset distance along the trajectory 104 before the intersection point 116, and the exit point for the vehicle 102 may represent a position with a 5-foot offset distance along the trajectory 104 after the intersection point 116. Similarly, the entry point for the vehicle 106 may represent a position with a 12-foot offset distance along the trajectory 112(3) before the intersection point 116, and the exit point 210 for the vehicle 106 may represent a position with an 8-foot offset distance along the trajectory 112(3) after the intersection point 116. It should be understood that these offset distances are examples only, and that in other examples the vehicle safety system may determine different offset distances based on safety buffers, object types and orientations, collision impact angles, and/or various other factors.

Figure 3A:
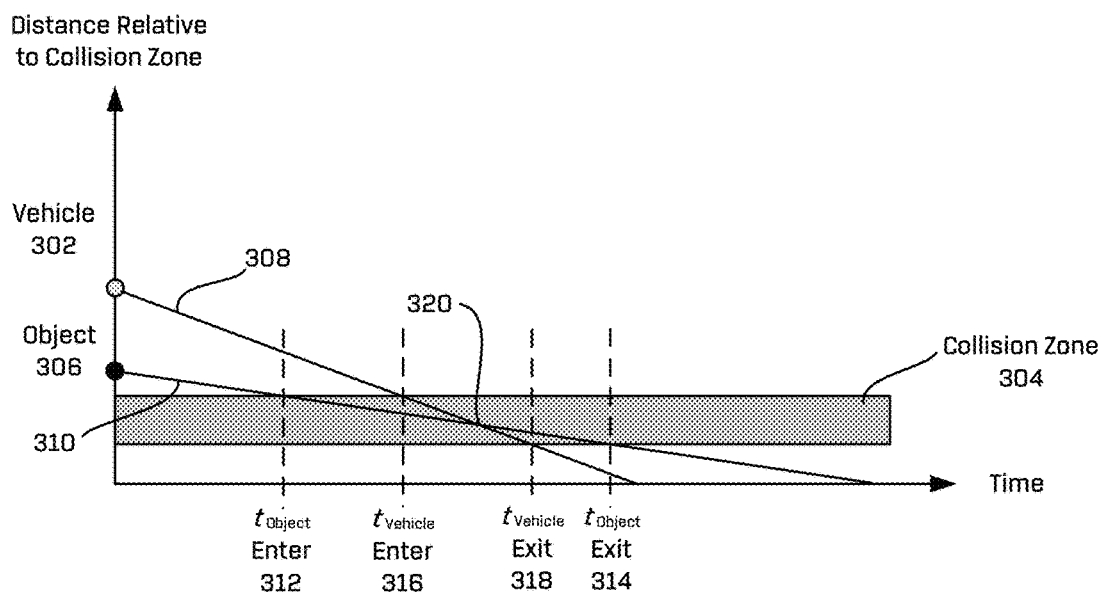
FIGS. 3A and 3B are graphs illustrating examples of a time-space overlap analysis between a vehicle and an object within a potential collision zone, in accordance with certain techniques described herein.
Figure 3B:
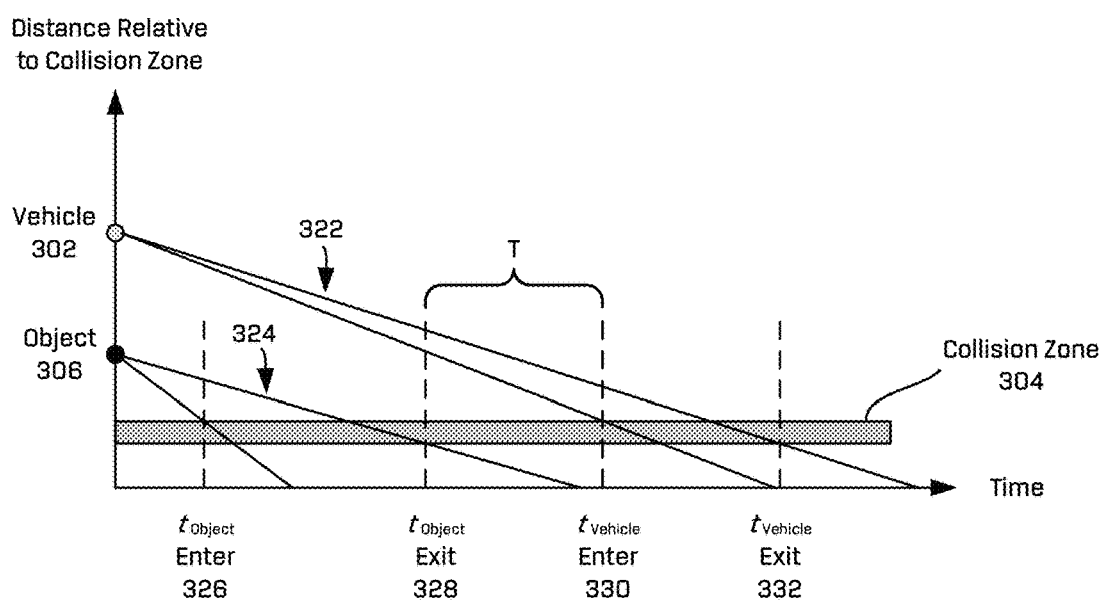

FIGS. 3A and 3B depict graphs 300A and 300B illustrating two examples of a time-space overlap analysis between a vehicle 302 and an object 306 within a potential collision zone 304. Vehicle 302 may be similar or identical to vehicle 102, and object 306 may be a second vehicle (e.g., vehicle 106) or any other moving object within the environment.

As discussed above, a vehicle safety system within the vehicle 302 may perform a time-space overlap analysis to determine the risk of collision between the vehicle 302 and object 306 within a potential collision zone 304. Referring now to FIG. 3A, graph 300A depicts an analysis and determination by a vehicle safety system that the vehicle 302 and object 306 may intersect (or collide), or that there is a high risk of an intersection/collision, based on the time-space overlap between the trajectories of the vehicle 302 and object 306 within the potential collision zone 304. In some examples, the vehicle safety system may determine that an intersection may occur, by calculating and comparing the entry and exit points of the vehicle 302 and the object 306 into and out of the potential collision zone 304. For instance, in FIG. 3A the position line 308 represents a planned trajectory of the vehicle 302, and indicates that the vehicle 302 may enter the potential collision zone 304 at time 312 and exit the potential collision zone 304 at time 314. In this example, the position line 310 represents a perturbed trajectory of the object 306, indicating that the object 306 may enter the potential collision zone 304 at time 316 and exit the potential collision zone 304 at time 318. Based on the overlap in the time windows for the vehicle 302 and the object 306 within the potential collision zone 304 and/or the intersection point 320 between the position lines 308 and 310 within the potential collision zone 304, the vehicle safety system may determine an intersection representing a potential collision between the vehicle 302 and the object 306.

In the above example, the vehicle safety system may determine the time-space overlap based on a single trajectory (corresponding to position line 308) for the vehicle 302 and a single perturbed trajectory (corresponding to position line 310) for the object 306. In other examples, the vehicle safety system may receive or determine multiple potential velocities associated with the vehicle 302 and/or the object 306. For instance, referring now to FIG. 3B, graph 300B depicts an analysis and determination by the vehicle safety system that the vehicle 302 and object 306 will not intersect (or collide), or that there is a low risk of an intersection/collision, based on the times at which the vehicle 302 and object 306 are predicted to enter and exit the potential collision zone 304. In this example, the vehicle safety system analyzes the time-space overlap between the trajectories of the vehicle 302 the object 306 within the potential collision zone 304, using position cones 322 and 324 based on different possible speeds at which the vehicle 302 the object 306 may travel up to and through the potential collision zone 304. As shown in this example, the vehicle safety system may determine a vehicle position cone 322 based on the planned trajectory for the vehicle 302 and estimations of the minimum and maximum velocities that the vehicle 302 may take along its planned trajectory. Similarly, the vehicle safety system may determine an object position cone 324 based on the perturbed trajectory for the object 306 and estimations of the minimum and maximum velocities that the object 306 may take along its planned trajectory. In this example, the vehicle position cone 322 and object position cone 324 do not overlap within the potential collision zone 304, and the vehicle safety system may determine based on the non-overlapping of the position cones 322 and 324 that the vehicle 302 and object 306 will not intersect, or that there is a low risk of an intersection/collision. Additionally, in some examples, the time-space overlap may be represented as one or more probability density functions (PDFs) associated with probable positions of the vehicle 302 and object 306 based on time.

In some implementations, the vehicle safety system may determine a binary collision prediction for the vehicle 302 and object 306 (e.g., collision or no collision). Additionally or alternatively, the vehicle safety system may determine a collision prediction as a probability, or a binary prediction combined with a confidence level. For instance, the vehicle safety system may determine a collision probability and/or collision prediction confidence level based on the time (T) between when the object 306 exited the potential collision zone 304 and when the vehicle 302 entered the potential collision zone 304, or vice versa. For a relatively small non-overlapping period of time (T), the vehicle safety system may predict a higher probability of a collision and/or a lower confidence level for a prediction of no collision between the vehicle 302 and the object 306. In contrast, for a larger non-overlapping period of time (T), the vehicle safety system may predict a lower probability of a collision and/or a higher confidence level for a prediction of no collision between the vehicle 302 and the object 306.

Figure 4:
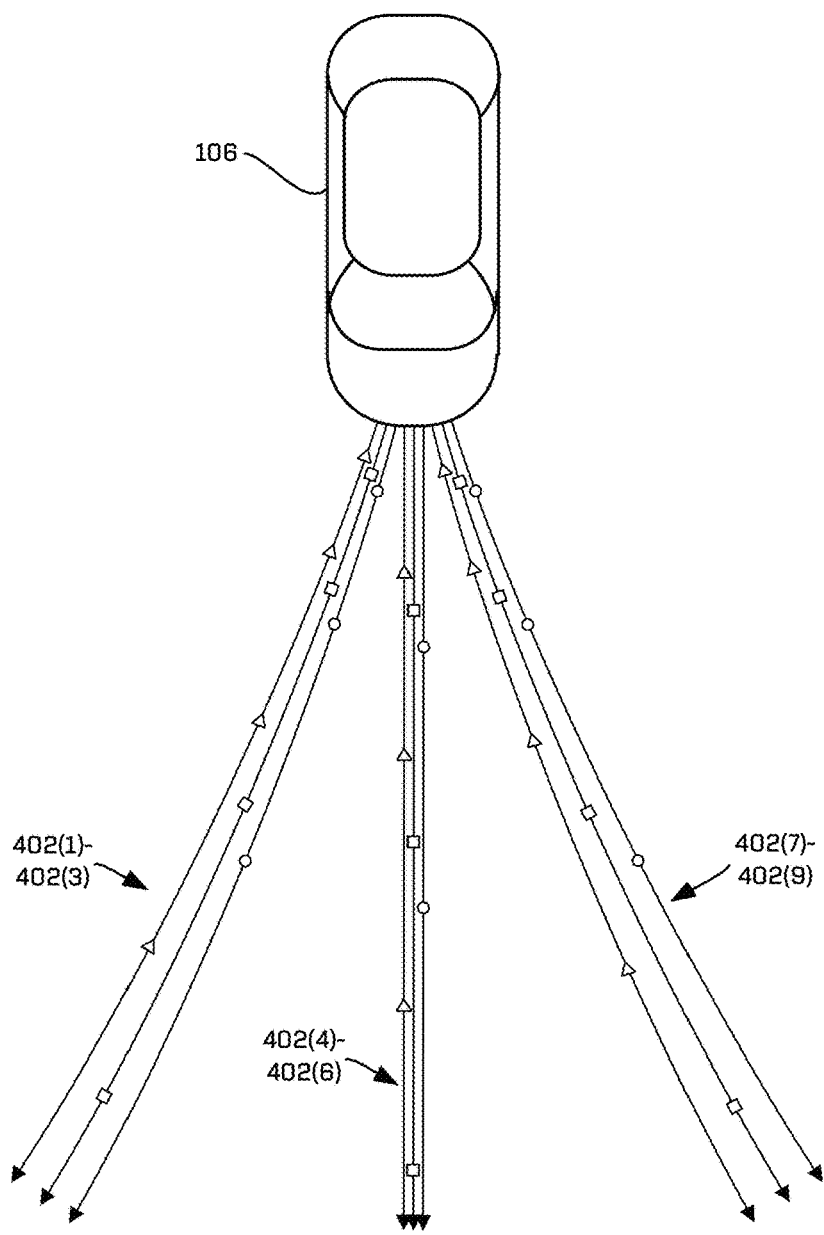
FIG. 4 illustrates a vehicle within an environment and multiple perturbed trajectories based on perturbations to the acceleration and steering angle rate of the object vehicle, in accordance with certain techniques described herein.

FIG. 4 illustrates a vehicle 106 moving within an environment 400. In this example, vehicle 106 may be an object vehicle that has been detected by a vehicle 102 including a vehicle safety system. In this example, the vehicle safety system of vehicle 102 has determined multiple perturbed trajectories 402 for the vehicle 106, based on perturbations to an acceleration parameter and a steering angle rate parameter determined for the vehicle 106. As noted above, the vehicle safety system may receive or determine object state data and/or attributes for the vehicle 106 and other moving objects within the environment 400, including the classification of the vehicle 106, the position and orientation/pose of the vehicle 106, and the current perceived state parameters for the vehicle 106 (e.g., velocity, acceleration, yaw rate, steering angle rate, etc.).

Using the perceived state parameters received or determined for the vehicle 106, the vehicle safety system may determine the perturbed trajectories 402 for the vehicle 106. In some examples, the vehicle safety system may determine the perturbed trajectories by perturbing (or modifying) one or more of the perceived state parameters of the vehicle 106 by an amount based on one or more perturbation parameters. The example in FIG. 4 illustrates the vehicle safety system of the vehicle 102 has received or determined the perceived acceleration (a) for the object vehicle 106, and based on an acceleration perturbation parameter (p) the vehicle safety system has generated two perturbed acceleration values (a−p, a+p). Additionally, in this example, the vehicle safety system has received or determined the perceived steering rate (s) for the object vehicle 106, and based on a separate steering rate perturbation parameter (q) the vehicle safety system has generated two perturbed steering rate values (s−q, s+q). For the purposes of illustration only, the acceleration perturbation parameter (p) may be +/−0.5 m/s$^2$, 1.0 m/s$^2$, 1.5 m/s$^2$, etc., and the steering rate perturbation parameter (q) may be +/−0.1 gradients per second (g/s), 0.2 g/s, 0.3 g/s, etc. The vehicle safety system may determine a set of perturbed acceleration values (a−p, a, a+p) and a set of perturbed steering angle rate values (s−q, s, s+q), by modifying the perceived acceleration and steering angle rate values using the perturbation parameters to determine the perturbed values. The vehicle safety system then may determine the perturbed trajectories based on a unique combination of each of the perturbed acceleration values and each of the perturbed steering angle rates. In this example, the vehicle safety system has determined nine perturbed trajectories 402(1)-402(9), based on the combinations of the three perturbed accelerations and the three perturbed steering angle rates.

Although this example illustrates determining different perturbed trajectories by perturbing (or modifying) the perceived acceleration and steering angle rate of the vehicle 106, in other examples the vehicle safety system may perturb other attributes of the vehicle 106, including any combination of one or more of the state parameters of the vehicle 106 (e.g., the velocity, yaw, yaw rate, steering angle rate, linear and/or angular acceleration, etc.). The vehicle safety system also may determine perturbed trajectories by perturbing other perceived data, such the position of the vehicle 106, the orientation (e.g., pose) of the vehicle 106, the size or classification of the vehicle 106, etc.

Additionally, although nine perturbed trajectories 402 are depicted in this example, the vehicle safety system may determine any number of trajectories in various other examples. For instance, for a state parameter (e.g., acceleration (a)), the vehicle safety system may determine a set of perturbed acceleration values including a plus and minus an acceleration perturbation parameter (p), a plus and minus 2*p, a plus and minus 3*p, and so on. In some example, the vehicle safety system may determine perturbed trajectories for an object in a bunched pattern, as shown in FIG. 4, and in other examples to perturbed trajectories may be calculated to be distributed more evenly through the environment. For instance, the vehicle safety system may calculate the distance between the adjacent perturbed trajectories 402 for the vehicle 106, to verify that the space between each two adjacent perturbed trajectories 402 is smaller than the size (e.g., width) of the vehicle 102. In some examples, the vehicle safety system may determine the outer limits of the perturbed sets of values based on the dynamic and/or kinetic capabilities of the moving object. For instance, a set of perturbed acceleration values and perturbed steering angle rate values for a vehicle 106 may be determined based on the type or classification of the vehicle (e.g., car, truck, motorcycle, bicycle, pedestrian, etc.) and sets of predetermined acceleration and steering capabilities and/or likelihoods associated with the particular type or classification of the vehicle 106. Additionally, in some examples the vehicle safety system may alter or limit the number of perturbed values based on the range of capabilities of the vehicle 106. For instance, if the perceived acceleration and/or steering angle rate for the vehicle 106 is at or near the acceleration and/or steering rate capabilities for that vehicle 106, the vehicle safety system may exclude any perturbed trajectories that go beyond the acceleration and/or steering rate capabilities for the vehicle 106.

Figure 5:
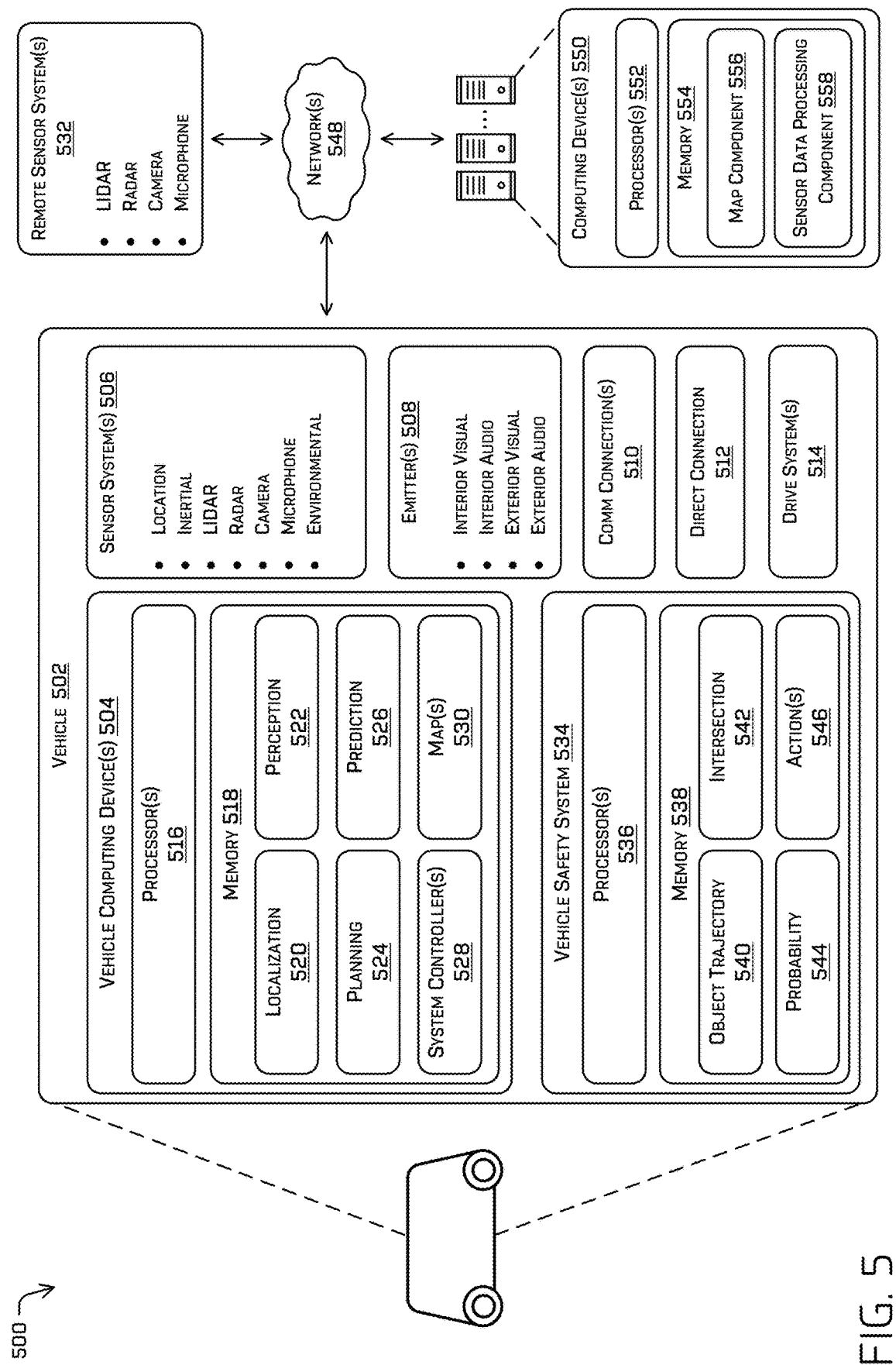
FIG. 5 is a block diagram of an example system for implementing various techniques described herein.

FIG. 5 is a block diagram of an example system computing 500 for implementing the techniques described herein. In at least one example, the computing system 500 may include a vehicle 502, such as vehicle 102.

In some examples, the vehicle 502 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more vehicle computing device(s) 504, one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the memory 518 of the vehicle computing device(s) 504 stores a localization component 520, a perception component 522, a planning component 524, a prediction component 526, one or more system controllers 528, and one or more maps 530.

Additionally, vehicle 502 may include a vehicle safety system 534, including an object trajectory component 540, an intersection component 542, a probability component 544, and an action component 546. As shown in this example, the vehicle safety system 534 may be implemented separately from the vehicle computing device(s) 504, for example, for improved performance of the vehicle safety system, and/or to provide redundancy, error checking, and/or validation of determinations and/or commands determined by the vehicle computing device(s) 504. However, in other examples, the vehicle safety system 534 may be implemented as one or more components within the same vehicle computing device(s) 504.

By way of example, the vehicle computing device(s) 504 may be considered to be a primary system, while the vehicle safety system 534 may be considered to be a secondary system. The primary system may generally perform processing to control how the vehicle maneuvers within an environment. The primary system may implement various artificial intelligence (AI) techniques, such as machine learning, to understand an environment around the vehicle 502 and/or instruct the vehicle 502 to move within the environment. For example, the primary system may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

In some examples, the vehicle safety system 534 may operate as separate system that receives state data (e.g., perception data) based on the sensor data and AI techniques implemented by the primary system (e.g., vehicle computing device(s) 504), and may perform various techniques described herein for improving collision prediction and avoidance by the vehicle 502. As described herein, the vehicle safety system 534 may implement techniques for determining perturbed trajectories and predicting intersections/collisions based on the perturbed trajectories, as well as probabilistic techniques that are based on positioning, velocity, acceleration, etc. of the vehicle and/or objects around the vehicle. In some examples, the vehicle safety system 534 may process data from sensors, such as a subset of sensor data that is processed by the primary system. To illustrate, the primary system may process lidar data, radar data, image data, depth data, etc., while the vehicle safety system 534 may process just lidar data and/or radar data (and/or time of flight data). In other examples, however, the vehicle safety system 534 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference for all purposes.

Although depicted in FIG. 5 as residing in the memory 518 for illustrative purposes, it is contemplated that the localization component 520, the perception component 522, the planning component 524, the prediction component 526, the system controllers 528, and the maps 530 may additionally, or alternatively, be accessible to the vehicle 502 (e.g., stored on, or otherwise accessible by, memory remote from the vehicle 502, such as, for example, on memory 554 of a remote computing device 550). Similarly, the although the object trajectory component 540, intersection component 542, probability component 544, and/or action component 546 are depicted as residing in the memory 538 of the vehicle safety system 534, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 554 of a remote computing device 550).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 may provide data to various components of the vehicle 502 to determine an initial position and/or trajectory of the vehicle 502, as discussed herein.

In some instances, the perception component 522 may include functionality to perform object detection, segmentation, and/or classification. In some examples, the perception component 522 may provide processed sensor data that indicates a presence of an object (e.g., entity or agent) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary object that is proximate to the vehicle 502 and/or a classification of the stationary object as a type (e.g., building, tree, road surface, curb, sidewalk, unknown, etc.). In additional or alternative examples, the perception component 522 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an extent (size) of the object, an object type (e.g., a classification), and state parameters such as the velocity of the object, an acceleration of the object, a steering angle rate and/or angular acceleration of the object, etc. Characteristics associated with the environment may include, but are not limited to, a presence of other objects in the environment, the state of other objects in the environment, a time of day, a day of a week, a season, a weather condition, a road condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the vehicle 502 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the prediction component 526 may generate perturbed trajectories of other objects (e.g., agents) in an environment. For example, the prediction component 526, which may be implemented within the planning component 524 in some cases, may generate one or more perturbed trajectories for objects within a threshold distance from the vehicle 502. In some examples, the prediction component 526 may measure a trace of an object (e.g., vehicle 106) and generate a trajectory for the object based on observed and predicted behavior.

In at least one example, the vehicle computing device(s) 504 may include one or more system controllers 528, which may be configured to control steering, propulsion, braking, safety, emitters, communication, and other systems of the vehicle 502. The system controller(s) 528 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the maps 530. That is, the maps 530 may be used in connection with the localization component 520, the perception component 522, the planning component 524, and/or the prediction component 526 to determine a location of the vehicle 502, detect objects in the environment, and/or generate routes and/or trajectories to navigate within the environment.

In some examples, the one or more maps 530 may be stored on a remote computing device(s) (such as the computing device(s) 550) accessible via network(s) 560. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

The vehicle safety system 534 may include an object trajectory component 540 configured to determine a trajectory for the vehicle 502 and/or perturbed trajectories for other objects identifying within an environment, using the various systems and techniques described herein. In some examples, the object trajectory component 540 may receive planning data, prediction data, perception data, and/or map data from the components 522-526 to determine a planned trajectory for the vehicle 502 and perturbed trajectories for the other objects in the environment.

In some examples, the object trajectory component 540 may determine trajectories as path polygons including plurality of points and representing a two-dimensional representation of a planned path of the vehicle 502 and/or other objects through the environment. Path polygons may be represented as pairs of points, representing left and right boundaries (or outermost edge) of the vehicle 502 or object for which a trajectory is being determined. In some examples, the left and right boundaries (e.g., minimum distance) may additionally include a buffer outside the outermost edge of the vehicle 502 or object. Additionally, path polygons or other sets of points defining a trajectory may be individually adjusted based on a maneuver of the vehicle 502 or other objects, such as turns. In such examples, the object trajectory component 540 may adjust a left point and/or a right point of a point pair for a trajectory outward a distance (e.g., 3 inches, 5 inches, 8 inches, etc.) based on the maneuver. In various examples, the left point and/or the right point may be adjusted outward the distance based on a radius of curvature associated with a turn.

In various examples, the object trajectory component 540 may generate a set of single points and/or pairs of related points (e.g., for a path polygon) representing a trajectory. As shown in FIG. 4, in some examples the pairs of points and/or single points for a single trajectory may be at consistent intervals (e.g., 0.2 second intervals, 0.5 second intervals, etc.) from one another. In some examples, the pairs of points and/or single points may be at varying intervals from one another. In various examples, the pairs of points and/or single points may be represented at equal distances in length (e.g., length along the path) from one another. In such examples, each left/right point of a point pair may be at a pre-defined distance (e.g., 1 meter, 3 feet, 18 inches, etc.) from the next left/right point of the point pair. In some examples, the pairs of points may be at different distances in length from one another. In various examples, the distances may be determined based on a vehicle/object maneuvers, speeds, density of traffic in the environment, and/or other factors impacting the vehicle 502 or object for which the trajectory is determined.

In some examples, the object trajectory component 540 determine a single planned trajectory for the vehicle 502 (e.g., based on planning data and map data received from the planning component 524 and maps 530), and may determine multiple perturbed trajectories for one or more other moving objects (e.g., vehicle 106) in the environment in which the vehicle 502 is operating. In some examples, the trajectories of another object may include any number of possible paths in which the object may travel from a current position (e.g., at the time of perception) and/or based on a direction of travel. For instance, as described herein, the object trajectory component 540 may determine multiple perturbed trajectories by determining and then perturbing one or more perceived state parameters (e.g., velocity, acceleration, steering angle rate, etc.) for the object. In some examples, the object trajectory component 540 may receive data from the perception component 522 regarding object(s) in the environment. In some examples, the object trajectory component 540 may determine that an object is within a threshold distance (e.g., one block, 200 meters, 300 feet, etc.) or threshold time (e.g., 2 seconds, 3 seconds, 6 seconds, etc.) of the vehicle 502. Based on the determination that the agent is within the threshold distance or time to the vehicle 502, the object trajectory component 540 may determine the trajectories associated with the object. In some examples, the object trajectory component 540 may be configured to determine the possible trajectories of each detected moving object in the environment.

In various examples, the intersection component 542 may use the various techniques described herein to determine intersections between the trajectory of the vehicle 502 and/or one or more of the perturbed trajectories for other objects in the environment, to determine whether a potential collision zone may exist in the environment. A potential collision zone may include an area in which, based on the path polygon(s) and the trajectories, a collision may occur between the vehicle 502 and an object (e.g., vehicle 106). In at least some examples, a perturbed trajectory for the object and object attributes (e.g., object size, position, orientation, pose, etc.) may be used to calculate an object polygon for the object. In such examples, a collision zone may be defined by the overlapping area between the path polygon for the vehicle 502 and the object polygon for the other object.

In some examples, the potential collision zone may exist between the vehicle 502 and the object if the trajectory associated with the vehicle 502 intersects with at least one perturbed trajectory associated with the object. In various examples, the intersection component 542 may determine that the potential collision zone may exist between the vehicle 502 and the object based on the vehicle and object trajectories being within a threshold distance (e.g., 2 feet, 3 feet, 4 meters, 5 meters, etc.). In some examples, the threshold distance may be based on a pre-defined distance. In various examples, the threshold distance may be determined based on a known or perceived width of the vehicle and/or of the object. In some examples, the threshold distance may be determined further a buffer, which may represent a safety buffer around the vehicle 502 and/or the object.

In some examples, the intersection component 542 may expand the edges of the vehicle trajectory and/or perturbed trajectories for the object, from the center of the vehicle 502 and object respectively, based on the known or perceived width of the vehicle and object. If the expanded width of the vehicle trajectory (or path polygon) and object trajectory (or path polygon) intersects and/or pass within a minimum allowable distance (e.g., 3 inches, 5 inches, 1 feet), the intersection component 542 may determine that the potential collision zone exists. If the expanded width of the vehicle trajectories and/or path polygons do not intersect and/or pass by more than the minimum allowable distance, the intersection component 542 may determine that the collision zone does not exist. The minimum allowable distance may be based on whether passengers are in the vehicle, a width of the roads in the environment, passenger comfort and/or reaction, learned tolerances of passengers, local driving etiquette, or the like.

In various examples, based on a determination that a potential collision zone may exist, the intersection component 542 may be configured to determine the bounds of the potential collision zone. In some examples, the potential collision zone may include four elements, a vehicle enter point, a vehicle exit point, an object enter point, and an object exit point. Each of the vehicle 502 and object enter and exit points may include a position and distance. The object entry point and object exit point may include trajectory samples, such as trajectory samples, along the trajectory of the object. In some examples, object entry point and agent exit point may represent trajectory samples in which a risk of collision does not exist. In various examples, an object enter point position may be determined by identifying the last trajectory sample associated with the perturbed trajectory of the object prior to an intersection (e.g., convergence) with the trajectory or path polygon for the vehicle 502. In some examples, an object exit point position may be determined by identifying the first trajectory sample associated with the object trajectory after the convergence between the perturbed trajectory of the object and the trajectory or path polygon of the vehicle 502. The distance associated with object enter point and the object exit point may be derived from the respective positions as a distance along the trajectory.

The intersection component 542 may determine vehicle enter point and vehicle exit point positions based on an offset distance before and after the vehicle trajectory or path polygon. In some examples, the offset distance may include a distance measured perpendicular to the trajectory of the vehicle 502. In some examples, the offset distance may include a distance measured along the path polygon (e.g., vehicle path) before and after the trajectory. In various examples, the offset distance may be measured from the center of the path polygon. In some examples, the offset distance may be measured from a forward most point of the vehicle along the path polygon. In such examples, the offset distance may account for vehicle maneuvers (e.g., turns) and an affect thereof on a position of the vehicle 502.

As discussed above, in various examples the intersection component 542 may perform time-space overlap analysis on one or more potential collision zones (bounds thereof, such as the vehicle and object enter and exit points). In various examples, the time-space overlap may be represented as position cones associated with predicted or perturbed object trajectories and the planned trajectory of the vehicle 502. In various examples, the intersection component 542 may be configured to determine a vehicle position cone and an agent position cone. The vehicle position cone may be determined based on probable velocities of the vehicle 502 along the planned trajectory (e.g., path polygon) through the potential collision zone. The object position cone may be determined based on probable velocities of the agent along the perturbed trajectory for the object associated with the potential collision zone.

In various examples, the probable velocities of the object may be derived from probable accelerations (e.g., positive and negative accelerations) of the intersection component 542. The accelerations may include positive accelerations based on a fast-behavioral model (e.g., aggressive behavior) and negative accelerations based on a slow-behavioral model (e.g., conservative behavior). In various examples, the positive accelerations associated with the object may be based on traffic laws, rules of the road, local driving etiquette, traffic patterns, semantic classification of the agent, or the like. In some examples, the positive accelerations may represent a maximum amount of positive acceleration probable in the environment based on an initial velocity. In various examples, the negative accelerations associated with the object may represent a maximum amount of negative acceleration probable in the environment, such as that based on the initial velocity of the object.

In various examples, intersection component 542 may determine position lines (e.g., 308 and 310) and/or position cones (e.g., 322 and 324) for the object and the vehicle 502 respective to the potential collision zone. The position lines and/or cones for the vehicle 502 and the object may be based on the object entry time, object exit time, vehicle entry time, and vehicle exit time with respect to the potential collision zone. For object and vehicle position cones 322 and 324, the intersection component 542 may determine the object entry time and the vehicle entry time based on respective maximum velocities. In such examples, the entry times into the potential collision zone may be associated with a most aggressive estimation of speed. In various examples, the object exit time and the vehicle exit time may be associated with respective minimum velocities. In such examples, the exit times into the potential collision zone may be associated with a most conservative estimation of speed.

In some examples, the time-space overlap may be represented as one or more probability density functions associated with probable positions of the object based on time. The probable positions of the object may be derived from probable accelerations, and speeds derived therefrom and/or outputs of other systems or subsystems (e.g., a prediction system, which may be, for example, a subsystem of the perception component 522). The probability density functions may represent aggressive and conservative driving speeds, as well as uncertainties based on accelerations of the object, such as those based on traffic laws, rules of the road, local driving etiquette, traffic patterns, semantic classification of the agent, or the like. The probability density functions may represent two-dimensional area or three-dimensional areas associated with the object. The total sum of the area under a curve of a probability density function may equal 1.

In various examples, probability component 544 may determine a prediction of a collision between the vehicle 502 and/or the other object (e.g., vehicle 106) and/or a probability/risk of collision, based on the time-space overlap analyses performed by the intersection component 542. In some examples, the probability component 544 may determine a probability of a collision based on a single trajectory of the vehicle 502 and a single perturbed trajectory of the object, based on an overlap between position lines and/or position cones of the vehicle 502 and object with respect to the potential collision zone. For instance, based on where in the potential collision zone that the position lines overlap, and/or the amount of overlap between the position cones (e.g., the time gap, percentage of cone overlap, etc.), the probability component 544 may determine that a risk of collision may be relatively high, medium, or low.

Additionally, using the various techniques described herein, the probability component 544 also may determine a probability of a collision between the vehicle 502 and an object, based on the planned trajectory of the vehicle 502 and multiple perturbed trajectories of the object. For example, the intersection component 542 may analyze multiple perturbed trajectories of the object (e.g., based on perturbations of the object state parameters), and the probability component 544 may determine a single collision prediction based on the results of the analyses the multiple perturbed trajectories. In some cases, the probability component 544 may determine a collision probability based on the percentage (or ratio) of perturbed trajectories for the object that are determined to intersect or collide with the vehicle 502 based on the planned vehicle trajectory.

In some implementations, the probability component 544 also may determine a trajectory probability associated with each the multiple perturbed trajectories for an object. By way of example only, each of the perturbed trajectories 402 described above in reference to FIG. 4 for the vehicle 106 may have an associated trajectory probability. The trajectory probability may refer to the probability that the object (e.g., vehicle 106) will follow the perturbed trajectory. In some examples, the probability component 544 also may determine that some perturbed trajectories 402 are more likely than others to be followed by the vehicle 106, and may assign different probabilities to the different perturbed trajectories. In such examples, the probability component 544 may use the different trajectory probabilities to weight the results of the analyses of the perturbed trajectories, and/or weighting the overall collision probability calculation in favor of the more likely perturbed trajectories and against the less likely perturbed trajectories. For example, as described below the probability component 544 may execute rules and/or models based observed movement patterns and behaviors from other vehicles, to determine more or less likely perturbed trajectories.

In various examples, the action component 546 may determine one or more actions for the vehicle 502 to take, based on predictions and/or probability determinations of a collision between the vehicle 502 another object (e.g., vehicle 106), along with other factors. The action may include slowing the vehicle to yield to the object, stopping the vehicle to yield to the object, changing lanes or swerving left, or changing or swerving lanes right, etc. Based on the determined action, the vehicle computing device(s) 504, such as through the system controller(s) 528, may cause the vehicle 502 to perform the action. In at least some examples, such an action may be based on the probability of collision, determined by the probability component 544 based on multiple perturbed trajectories for the object, as described in detail. In various examples, responsive to determining to adjust a lateral position of the vehicle, such as in a lane change to the left or to the right, the vehicle safety system 534 may cause the components 540-546 to generate an updated vehicle trajectory (or path polygon), plot additional object trajectories with respect to the updated vehicle trajectory, determine updated potential collision zones, and perform time-space overlap analyses to determine whether a collision risk may still exist after the determined action is performed by the vehicle 502.

As can be understood, the components discussed herein (e.g., the localization component 520, the perception component 522, the planning component 524, the prediction component 526, the one or more system controllers 528, the one or more maps 530, and the vehicle safety system 534 including the object trajectory component 540, the intersection component 542, the probability component 544, and the action component 546 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memories 518 and 538 (and the memory 554, discussed below) may be implemented as a neural network.

In at least one example, the sensor system(s) 506 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the LIDAR sensors may include individual LIDAR sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally or alternatively, the sensor system(s) 506 may send sensor data, via the one or more networks 548, to the vehicle safety system 534 and/or to computing device(s) 550 at a particular frequency, after a lapse of a predetermined period of time, in near real-time, etc.

The vehicle 502 may also include one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device(s) 550, other nearby vehicles, etc.) and/or one or more remote sensor system(s) 532 for receiving sensor data.

The communications connection(s) 510 may include physical and/or logical interfaces for connecting the vehicle computing device(s) 504 to another computing device or a network, such as network(s) 548. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the prediction component 526, the one or more system controllers 528, the one or more maps 530, and the vehicle safety system 534 and various components thereof, may process sensor data, as described above, and may send their respective outputs, over the one or more network(s) 548, to the remote computing device(s) 550. In at least one example, the localization component 520, the perception component 522, the planning component 524, the prediction component 526, the one or more system controllers 528, the one or more maps 530, and the vehicle safety system 534 may send their respective outputs to the computing device(s) 550 at a particular frequency, after a lapse of a predetermined period of time, in near real-time, etc.

In some examples, the vehicle 502 may send sensor data to the computing device(s) 550 via the network(s) 548. In some examples, the vehicle 502 may receive sensor data from the remote sensor system(s) 532 and/or computing device(s) 550, via the network(s) 548. The sensor data may include raw sensor data and/or processed sensor data and/or representations of sensor data. In some examples, the sensor data (raw or processed) may be sent and/or received as one or more log files.

The computing device(s) 550 may include processor(s) 552 and a memory 554 storing a map component 556 and a sensor data processing component 558. In some examples, the map component 556 may include functionality to generate maps of various resolutions. In such examples, the map component 556 may send one or more maps to the vehicle computing device(s) 504 for navigational purposes. In various examples, the sensor data processing component 558 may be configured to receive data from one or more remote sensors, such as sensor systems 506 and/or remote sensor system(s) 532. In some examples, the sensor data processing component 558 may be configured to process the data and send processed sensor data to the vehicle 502, such as for use by the vehicle safety system 534. In some examples, the sensor data processing component 558 may be configured to send raw sensor data to the vehicle computing device(s) 504 and/or to the vehicle safety system 534.

The processor(s) 516 of the vehicle 502, processor(s) 536 of the vehicle safety system 534, and/or the processor(s) 552 of the computing device(s) 550 may be any suitable processor capable of executing instructions to process data and perform operations as described herein. By way of example and not limitation, the processor(s) 516, 536, and 552 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory systems 518, 538, and/or 554 are examples of non-transitory computer-readable media. The memory systems 518, 538, and/or 554 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory systems 518, 538, and/or 554 may include at least a working memory and a storage memory. For example, the working memory may be a high-speed memory of limited capacity (e.g., cache memory) that is used for storing data to be operated on by the processor(s) 516, 536, and/or 552. In some instances, the memory systems 518, 538, and/or 554 may include a storage memory that may be a lower-speed memory of relatively large capacity that is used for long-term storage of data. In some cases, the processor(s) 516, 536, and/or 552 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 550 and/or components of the computing device(s) 550 may be associated with the vehicle 502. That is, the vehicle 502 may perform one or more of the functions associated with the computing device(s) 550, and vice versa.

Figure 6:
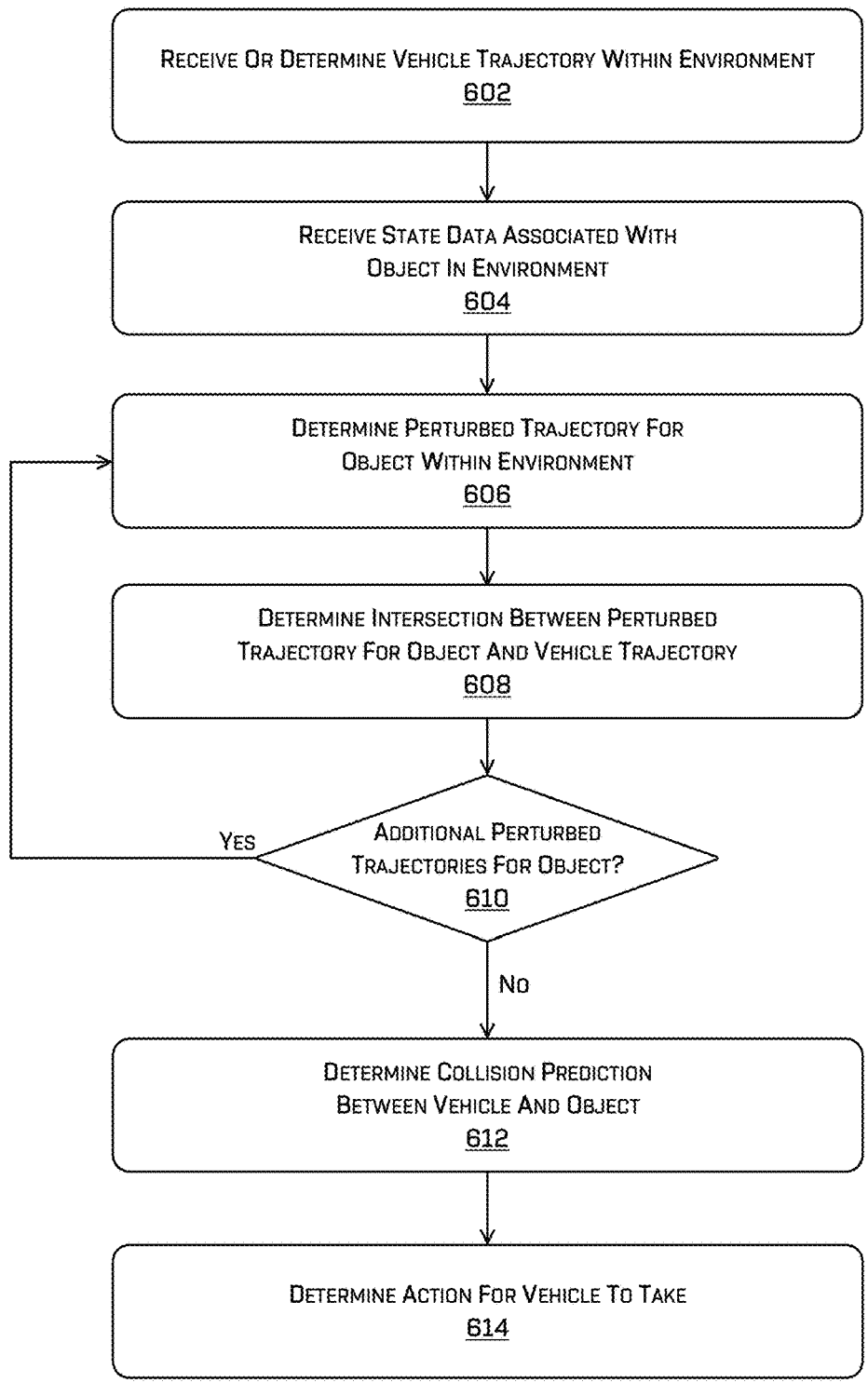
FIG. 6 illustrates an example process of determining predictions and/or probabilities associated with a potential collision between a vehicle and an object moving in an environment, in accordance with certain techniques described herein.

FIG. 6 illustrates an example process 600 for determining predictions and/or probabilities associated with a potential collision between a vehicle and an object moving in an environment, and determining actions for the vehicle to take based on the collision predictions and/or probabilities. In some instances, some or all of example process 600 may be performed by one or more components in computing system 500, as described herein. For instance, example process 600 may be described with reference to the vehicle safety system 534 in FIG. 5, based on state data received from the components of the vehicle computing device(s) 504. However, it is contemplated that process 600 also may utilize computing environments and architectures other than those depicted in computing system 500.

At operation 602, the vehicle safety system 534 may receive or determine data identifying a trajectory for a vehicle traversing an environment. The vehicle may be similar or identical to vehicle 102, and the vehicle trajectory may be the planned trajectory 104 of the vehicle 102, as discussed above. In some cases, the vehicle safety system 534 may receive the vehicle attribute for the vehicle 102 (e.g., position/location data, classification data, size data, orientation/pose data, state parameters, etc.) from the components of the vehicle computing device(s) 504, and may determine the planned trajectory for the vehicle 102 based on the vehicle attribute data. Additionally or alternatively, the vehicle safety system 534 may receive a planned vehicle trajectory for the vehicle 102 planning component 524 and/or other components of the vehicle computing device(s) 504. As discussed above, the trajectory for the vehicle 102, received or determined by the vehicle safety system 534, may comprise a set of planned path points and/or a path polygon representing a two-dimensional representation of a planned path of the vehicle 102 through the environment 100.

At operation 604, the vehicle safety system 534 may receive state data associated with one or more other objects moving in the same environment in which the vehicle 102 is moving. In this example, the received state data may relate to a second vehicle 106 moving in the environment 100, although in other examples the received state data may comprise data associated with multiple different moving objects, including objects of any type/classification cars, trucks, motorcycles, bicycles, animals, pedestrians, etc.). The state data received by the vehicle safety system 534 for the object vehicle 106 (and/or other objects) may include object attributes such as position/location of the object, the object classification/type, object size data, object orientation and pose data, and various state parameters associated with the vehicle 106. As discussed above, the state parameters may include, for instance, a perceived velocity, linear acceleration, angular acceleration, steering angle rate, yaw rate, etc., and/or any other perceived movement characteristics of the vehicle 106. In some examples, the vehicle safety system 534 may receive the state data associated with the vehicle 106 from the perception component 522 and/or other components of the vehicle computing device(s) 504. The state data may be determined using AI techniques within the components of the vehicle computing device(s) 504 to localize the vehicle 106, determine a distance and orientation between vehicles 102 and 106, segment sensor data, determine a classification of the vehicle 106, perceive and predict vehicle movements, and generate a planned path or trajectory for the vehicle 106.

At operation 606, the vehicle safety system 534 may determine a perturbed trajectory for the object (e.g., vehicle 106) based on the state data received for the object in operation 604. As described above, object trajectory component 540 may determine a perturbed trajectory for the vehicle 106 by perturbing (or modifying) one or more of the current perceived state parameters of the vehicle 106. For instance, the vehicle safety system 534 may perturb the current perceived velocity of the vehicle 106 based on a velocity perturbation parameter, or may perturb the current perceived acceleration of the vehicle 106 based on an acceleration perturbation parameter, or may perturb the current perceived steering angle rate of the vehicle 106 based on a steering angle rate perturbation parameter, and so on. In this example, one or more perturbed parameters determined by the vehicle safety system 534 may be combined with the addition unperturbed parameters to determine a perturbed trajectory for the vehicle 106. For instance, the vehicle safety system 534 may use a perturbed acceleration parameter (e.g., a+p) and the unperturbed parameters for velocity, steering angle rate, etc., to determine the perturbed trajectory at operation 606.

At operation 608, the vehicle safety system 534 may determine an intersection between the vehicle trajectory received or determined at operation 602 and the perturbed trajectory of the object (e.g., vehicle 106) determined at operation 606. In some examples, the intersection component 542 may perform one or more of the various techniques described herein to determine an intersection the vehicle trajectory and the perturbed trajectory for the vehicle 106. For instance, the intersection component 542 may determine a potential collision zone and perform a time-space overlap analysis within the potential collision zone, between the vehicles 102 and 106, as described above. In some cases, the vehicle safety system 534 may determine in operation 608 either that vehicle 102 and vehicle 106 are predicted to collide or are not predicted to collide, based on their trajectories. In other examples, the vehicle safety system 534 may determine in operation 608 a probability of a collision between vehicle 102 and vehicle 106, or a prediction (e.g., intersection or non-intersection, collision or no collision) along with a confidence level associated with the prediction.

At operation 610, the vehicle safety system 534 may determine whether or not there are additional perturbed trajectories for the object (e.g., vehicle 106) to be analyzed and/or evaluated. As noted above, the vehicle safety system 534 may determine multiple perturbed trajectories based on various combinations of perturbed parameters for the vehicle 106. For instance, the example of FIG. 1 depicts three perturbed trajectories, the example of FIG. 4 depicts nine perturbed trajectories 402, the example in FIG. 7 depicts 49 perturbed trajectories, and the object trajectory component 540 of the vehicle safety system 534 may determine any number of perturbed trajectories in other examples. When the vehicle safety system 534 determines that additional trajectories are to be determined and/or analyzed for the vehicle 106 (610: Yes), process 600 returns to operation 606 to determine and/or analyze another perturbed trajectory for the vehicle 160.

In contrast, when the vehicle safety system 534 determines that all of the perturbed trajectories associated with the vehicle 106 have been determined and analyzed (610: No), process 600 proceed to 612 to perform one or more collision predictions based on perturbed trajectories for the vehicle 106. In some examples, the vehicle safety system 534 may use a probabilistic approach, by determining multiple perturbed trajectories for the vehicle 106, analyzing each of the individual perturbed trajectories with respect to a potential collision with the vehicle 102, and then aggregating the results of the analyses to calculate the overall probability of a collision occurring. For instance, when the object trajectory component 540 determines multiple trajectories for the object (e.g., vehicle 106), the vehicle safety system 534 may determine a first number of the trajectories that are predicted to intersect with the trajectory of the vehicle 102, and a second number of the trajectories that are predicted not to intersect with the trajectory of the vehicle 102. The vehicle safety system 534 then may calculate a probability of an intersection/collision between the vehicles 102 and 106, based on the ratio between the first and second numbers.

Referring briefly to FIG. 7, a chart 700 is shown illustrating a matrix of perturbed trajectories for an object (e.g., vehicle 106). In this example, the vehicle safety system 534 may determine matrix of perturbed trajectories based on a set of seven perturbed acceleration values (a−3p to a+3p) and a set of seven perturbed steering angle rate values (s−3q to s+3q), resulting in 49 different perturbed trajectories for the vehicle 106. The vehicle safety system 534 has analyzed each the perturbed trajectories in this example, to determine an intersection prediction (e.g., prediction of a potential collision) associated each perturbed trajectory. In this example, the intersection predictions are binary (Y/N) values, and the vehicle safety system 534 has determined a positive intersection prediction for 17 of the 49 of perturbed trajectories. Accordingly, for the example shown in chart 700 the vehicle safety system 534 may determine a 35% probability (e.g., 17/49) of an intersection (or collision) between vehicles 102 and 106 in operation 612.

Although the example in FIG. 7 represents intersection predictions as binary (Yes/No) values, in other examples the intersection component 542 of the vehicle safety system 534 may determine a separate probability (e.g., 0.00 to 1.00) for each perturbed trajectory associated with the vehicle 106. In such examples, the vehicle safety system 534 may calculate an overall probability of an intersection between vehicles 102 and 106 based on the separate probabilities, for instance, by averaging and/or performing other statistical techniques on the separate probabilities.

The predictions determined and/or probabilities calculated in operation 612 may include predictions or probabilities of a collision between vehicles 102 and 106, as well as additional predictions and/or probabilities relating to the potential collision. For instance, as described in more detail below, the vehicle safety system 534 also may determine potential collision characteristics in operation 612 based on the vehicle trajectories and other vehicle attributes. Such collision characteristics may include, for example, a severity measurement of a potential collision, and a confidence level associated with the potential collision.

At operation 614, the vehicle safety system 534 may determine one or more actions for the vehicle 102 to take, based on the collision predictions determined and/or probabilities calculated in operation 612. For example, the action component 546 of the vehicle safety system 534 may determine the actions for the vehicle 102 to take based on the prediction of an intersection (or non-intersection) and/or a collision (or no collision), the probabilities and/or confidence levels associated with the prediction, and other factors (e.g., the severity of a potential collision). In various examples, the action component 546 may determine actions for the vehicle 102 include slowing or stopping the vehicle 102 to yield to the object, changing lanes or swerving to left or right to avoid the object, and/or performing any other vehicle through the system controller(s) 528 to increase the likelihood of avoiding and/or mitigating the damage of a potential collision.

In some examples, the vehicle safety system 534 may determine the action(s) for the vehicle 102 to take in operation 614 based on multiple collision probability thresholds and/or ranges. For instance, when the vehicle safety system 534 determines a collision probability in operation 612 (e.g., N % probability of collision), then in operation 614 the vehicle safety system 534 may compare the probability value to one or more collision probability thresholds or ranges. To illustrate, the vehicle safety system 534 may determine a first set of actions for the vehicle 102 when determining a 95% probability of a collision, a second set of actions for the vehicle 102 when determining a 75% probability of a collision, a second set of actions for the vehicle 102 when determining a 50% probability of a collision, and so on.

Figure 8:
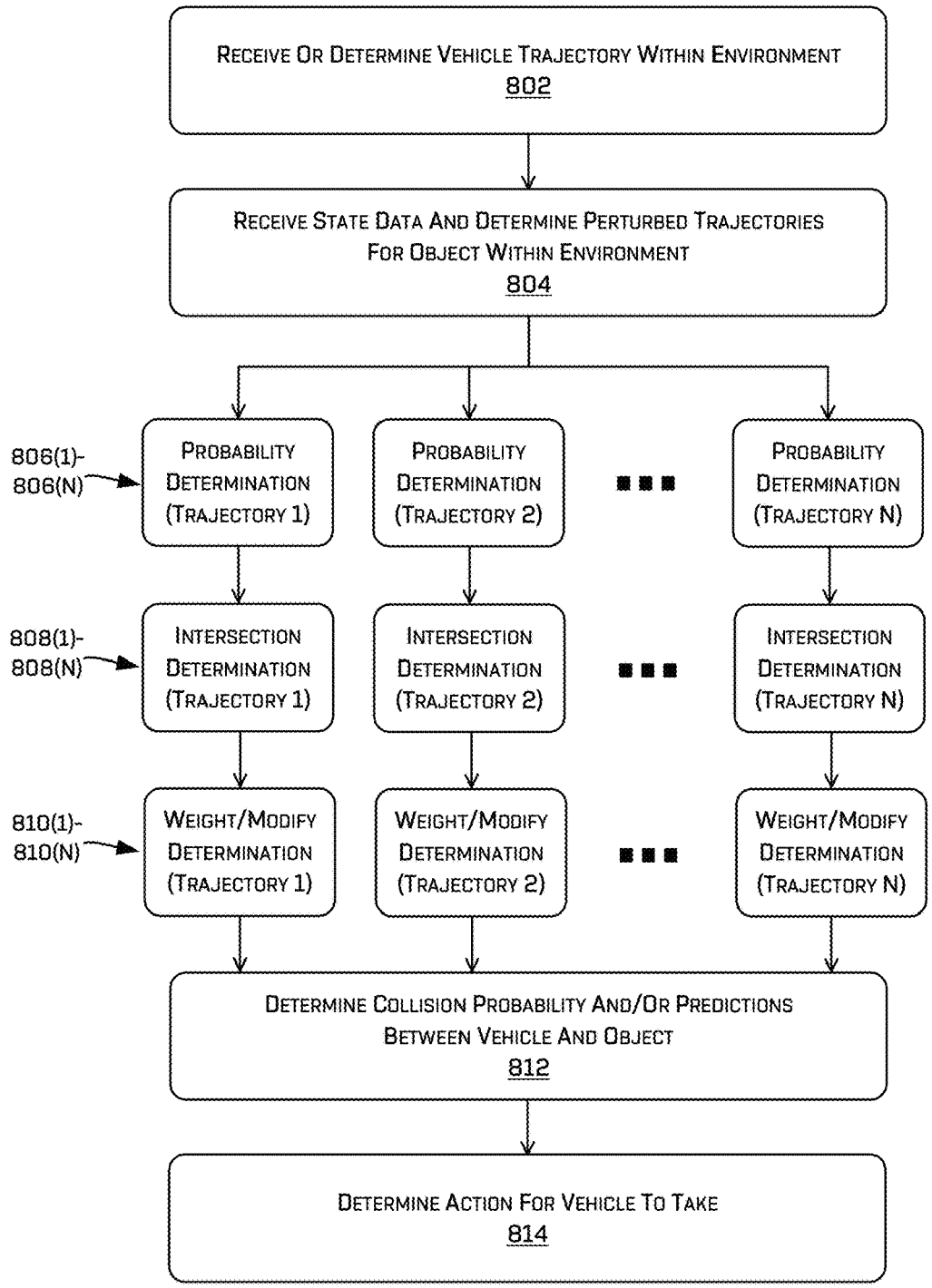
FIG. 8 illustrates another example process of determining predictions and/or probabilities associated with a potential collision between a vehicle and an object moving in an environment, in accordance with certain techniques described herein.

FIG. 8 illustrates another example process 800 for determining predictions and/or probabilities associated with a potential collision between a vehicle and an object moving in an environment, and determining actions for the vehicle to take based on the collision predictions and/or probabilities. In some examples, process 800 may represent a one or more specific implementations of process 600, including additional features and techniques. For instance, as described below, process 800 may be used to describe techniques in which the vehicle safety system 534 determines different probabilities for different perturbed trajectories of the object (e.g., vehicle 102). Process 800 also may include techniques in which the collision probabilities and/or determined actions for the vehicle 102 may be weighted and/or adjusted based on additional factors such as the predicted severity of the potential collision, predicted near misses, and the consistency and reliability of the state data or sensor data used to determine the perturbed trajectories for the object vehicle 106. As discussed above with process 600, some or all of example process 800 may be performed by one or more components in computing system 500. For instance, example process 600 may be described with reference to the vehicle safety system 534 in FIG. 5, based on state data received from the components of the vehicle computing device(s) 504. However, it is contemplated that process 600 also may utilize computing environments and architectures other than those depicted in computing system 500.

At operation 802, the vehicle safety system 534 may receive and/or determine a trajectory for the vehicle 102 traversing the environment. In some examples, operation 802 may be similar or identical to operation 602 described above. For instance, in operation 802 the vehicle safety system 534 may receive or determine data identifying a trajectory for the vehicle 102 traversing the environment 100. In some cases, the vehicle safety system 534 may receive a perceived (or current) trajectory of the vehicle 102 along with additional vehicle attributes (e.g., position/location, classification, size, orientation/pose, state parameters, etc.) from the planning component 524 or other components of the vehicle computing device(s) 504.

At operation 804, the vehicle safety system 534 may receive state data and determine multiple different predicted associated with another object (e.g., vehicle 106) moving within in the environment, and may determine multiple perturbed trajectories for the object based on the received state data. In some examples, operation 802 may be similar or identical to operations 604 and 606 in process 600. As described above, the object trajectory component 540 of the vehicle safety system 534 may determine a set of perturbed trajectories for the vehicle 106 by perturbing (or modifying) the current perceived state parameters of the vehicle 106. For instance, the object trajectory component 540 may use one or more perturbation parameters to perturb the state parameters of the vehicle 106 (e.g., velocity, acceleration, steering angle rate, etc.).

As shown in FIG. 8, process 800 branches at operation 806, indicating that the vehicle safety system 534 may perform operations 806-812 separately for each perturbed trajectory determined for the vehicle 106 in operation 804. As described below, for each different perturbed trajectory for an object (e.g., vehicle 106), the vehicle safety system 534 may determine a probability associated with the perturbed trajectory, a prediction and/or probability of an intersection or collision between the vehicles 102 and 106, and/or weights or modifications based on additional factors which may be specific to the perturbed trajectory. In various examples, the separate operations 806-812 may be performed in parallel or sequentially by the vehicle safety system 534 for the different perturbed trajectories.

At each of operations 806(1)-806(N) (collectively operation 806), the vehicle safety system 534 may determine a probability (e.g., 0.00 to 1.00) associated with the perturbed trajectory. In some examples, the vehicle safety system 534 may determine the probability of a perturbed trajectory based on historical/observed movement patterns of similar objects and/or objects in similar scenarios to the current scenario of the vehicle 106. For instance, the vehicle safety system 534 may train and execute machine-learned models based on observed vehicle behaviors and/or movement patterns while driving or performing particular maneuvers (e.g., backing, parking, merging, etc.). For example, a trained model may determine that certain maneuvers are uncommon for certain vehicle types, such as holding high linear or lateral acceleration in a car or truck for extended periods of time, and the vehicle safety system may discount the probability of perturbed trajectories determined by the trained model to be less likely. In some instances, the vehicle safety system 534 may use one or more filters (e.g., Extended Kalman Filters (EKFs), Unscented Kalman Filter (UKFs)) based on the perceived state data and covariance to determine output probabilities that the object 106 is following particular perturbed trajectories. Additionally or alternatively, the vehicle safety system 534 may perform a heuristic rules-based analysis to predict the likelihood of the vehicle 106 following the particular trajectory, based on historical data of objects having a similar orientation, velocity, and positioning with respect to the other objects in the environment. Accordingly, the historical data may represent previous objects performing similar maneuvers to those being performed by the vehicle 106 at the current time. In some examples, the vehicle safety system 534 may use historical data associated with objects having a similar classification, size, orientation, and velocity as the vehicle 106, in order to more accurately predict the trajectory that the vehicle 106 will take.

Additionally or alternatively, the vehicle safety system 534 may determine a probability that the vehicle 106 will follow a particular trajectory in operation 806, based on the road configuration in the environment 100 (e.g., lane markings, median position, traffic lights and signs, crosswalks, etc.), along with the traffic laws, rules of the road, local driving etiquette, traffic patterns, and the like.

Further, in some examples, the vehicle safety system 534 may determine probability of a perturbed trajectory in operation 806 based on the positions of other stationary objects within the environment 100 (e.g., trees, curbs, medians, parked cars, etc.) and the current or perturbed trajectories of other moving objects within the environment 100. For instance, the vehicle safety system 534 may determine a lower probability for a perturbed trajectory that would drive the vehicle 106 into a tree, a parked car, or into the current path of moving object (e.g., bicycle, car, or pedestrian) that is currently within view of the vehicle 106. Similarly, the vehicle safety system 534 may determine relatively higher probabilities for perturbed trajectories that would drive the vehicle 106 into clearly visible stationary or moving objects.

At each of operations 808(1)-808(N) (collectively operation 808), the vehicle safety system 534 may perform one or more intersection determinations based on the planned trajectory of the vehicle 102 and the particular perturbed trajectory associated with the vehicle 106. In some examples, operation 808 may be similar or identical to operations 608 in process 600. For example, in operation 808 the vehicle safety system 534 may determine an intersection between the vehicle trajectory received or determined at operation 802 and the particular perturbed trajectory of the vehicle 106. As discussed above, the intersection component 542 may determine a potential collision zone and perform a time-space overlap analysis within the potential collision zone between the vehicles 102 and 106. In operation 808, the vehicle safety system 534 may perform one or more prediction determinations and/or probability calculations, including predictions regarding whether vehicles 102 and 106 will collide based on the trajectories, probabilities of collision between the vehicles, and/or collision predictions along with associated confidence levels.

At each of operations 810(1)-810(N) (collectively operation 810), the vehicle safety system 534 may determine one or more weight values and/or modifications to be applied to the collision predictions and/or probabilities determined in operation 808. In some examples, the vehicle safety system 534 may determine severity levels associated with potential collisions between the vehicles 102 and 106. For instance, for a positive collision prediction (or a collision probability greater than 0%) in operation 808, the vehicle safety system 534 may determine one or more severity metrics for the potential collision, based on the impact angles, impact positions of the vehicles, and other characteristics of the potential collision. Using such factors, the vehicle safety system 534 may determine whether the potential collision is a grazing collision or a center of mass impact collision. The vehicle safety system 534 also may determine whether the potential collision is a rear-impact collision, a side-impact collision, or a front-impact collision, etc. In some examples, the vehicle safety system 534 may use additional factors such as the vehicle and object classification types (e.g., trucks, cars, motorcycles, bicycles, pedestrians, etc.) and the vehicle speeds, sizes/weights, number of passengers, road and weather conditions, and the like, to determine the severity metrics for the potential collision.

Additionally, in operation 810, the vehicle safety system 534 may determine one or more weight values and/or modifications based on the confidence levels associated with the collision predictions and/or collision probability calculations determined in operation 808. For instance, the vehicle safety system 534 may determine lower confidence levels for no collision predictions in which the predicted distance and/or time gap between the vehicles 102 and 106 in the potential collision zone is below a particular threshold (e.g., near misses). Additionally the vehicle safety system 534 may determine lower confidence for predictions of collisions or no collisions in situations when the sensor data or perception data is determined to be potentially unreliable, inconsistent, and/or compromised by environmental factor (e.g., partial occlusions between the vehicles, darkness, fog, rain, etc.).

At operation 812, the vehicle safety system 534 may perform one or more overall collision predictions and/or collision probability determinations for the vehicles 102 and 106, based on the combination or aggregation of the individual trajectories determined in operations 806-810. In some examples, operation 812 may be similar or identical to operation 612 in process 600. For instance, the vehicle safety system 534 may calculate an overall probability of a collision between the vehicles 102 and 106 by averaging or aggregating the intersection/collision prediction results or probabilities determined in operation 806, over all of the perturbed trajectories of the vehicle 106. In various examples, in operation 812 the vehicle safety system 534 may calculate a ratio of collision predictions to no collision predictions for the multiple perturbed trajectories. Additionally or alternatively, the vehicle safety system 534 may average the separate collision probabilities determined in operation 808 for the multiple perturbed trajectories.

In some examples, the determinations and/or calculations performed by the vehicle safety system 534 in operation 812 also may be based on the trajectory probabilities determined in operation 806. For instance, when aggregating, averaging, or otherwise combining collision predictions or probabilities for the different perturbed trajectories, the vehicle safety system 534 weight or modifying the calculation using a trajectory probability variable so that higher-probability trajectories affect the overall collision predictions and probabilities more than lower-probability trajectories. In various examples, the vehicle safety system 534 may scale and/or normalize the various probabilities determined in operation 806 to determine overall collision probability in operation 812. Additionally, the vehicle safety system 534 also may modify the overall collision predictions and probabilities determined in operation 812 based on the additional weight values and/or modifications from operation 810. For instance, the vehicle safety system 534 may increase a collision probability or other related prediction based on determining a higher level of severity for the potential collision from one or more perturbed trajectories in operation 810. Similarly, in some examples, the vehicle safety system 534 may increase a collision probability or other related prediction based on determining a lower level of confidence or reliability associated with the collision predictions/probabilities for the perturbed trajectories in operation 810.

EXAMPLE CLAUSES

A. A system comprising: one or more processors; and one or more non-transitory computer-readable media storing computer-executable instructions that, when executed, cause the one or more processors to perform operations comprising: receiving state data associated with an object in an environment, the state data based at least in part on sensor data captured by a sensor of a vehicle, and the state data associated with a first time; determining, based at least in part on the state data and a perturbation parameter, a plurality of perturbed trajectories associated with the object; receiving a trajectory associated with the vehicle in the environment; determining, based at least in part on a first perturbed trajectory and the trajectory associated with the vehicle, an intersection associated with the object and the vehicle at a second time after the first time; determining, based at least in part on the intersection, an action for the vehicle; and controlling operation of the vehicle based at least in part on the action.

B. The system of paragraph A, the operations further comprising: determining, based at least in part on the plurality of perturbed trajectories and the trajectory associated with the vehicle, a number of intersections associated with the plurality of perturbed trajectories; determining that the number of intersections meets or exceeds a threshold number; and determining, further based at least in part on the number of intersections, the action for the vehicle.

C. The system of any one of paragraphs A-B, the operations further comprising: determining a probability associated with the first perturbed trajectory, the probability indicative of a likelihood for the object to follow the first perturbed trajectory; and determining, further based at least in part on the probability and the number of intersections, the action for the vehicle.

D. The system of any one of paragraphs A-C, wherein the state data comprises acceleration data associated with the object, a steering angle rate associated with the object, and a classification associated with the object, wherein determining the first perturbed trajectory comprises varying at least one of the acceleration data or the steering angle rate, based at least in part on the perturbation parameter, and wherein the perturbation parameter is based at least in part on the classification associated with the object.

E. The system of any one of paragraphs A-D, wherein determining the intersection comprises: determining a first region associated with the vehicle at the second time, based at least in part on the trajectory; determining a second region associated with the object at the second time, based at least in part on the first perturbed trajectory; and determining an overlap between the first region and the second region.

F. A method comprising: receiving state data associated with an object in an environment; receiving a perceived trajectory associated with the object; determining, based at least in part on the perceived trajectory, a perturbed trajectory; receiving a trajectory associated with a vehicle in the environment; determining, based at least in part on the perturbed trajectory and the trajectory, a likelihood of collision between the object and the vehicle; and determining, based at least in part on the likelihood of collision, an action for the vehicle.

G. The method of paragraph F, wherein determining the perturbed trajectory comprises determining a plurality of perturbed trajectories, the method further comprising: determining, based at least in part on the plurality of perturbed trajectories and the trajectory, a number of potential collisions between the vehicle and the object; determining that the number of potential collisions meets or exceeds a threshold number; and determining, further based at least in part on the number of potential collisions, the action for the vehicle.

H. The method of any one of paragraphs F-G, further comprising determining a probability of a collision between the vehicle and the object, based at least in part on the number of potential collisions relative to a number of the plurality of perturbed trajectories.

I. The method of any one of paragraphs F-H, wherein the state data comprises acceleration data associated with the object, a steering angle rate associated with the object, and wherein determining the plurality of perturbed trajectories associated with the object comprises varying at least one of the acceleration data or the steering angle rate.

J. The method of any one of paragraphs F-I, wherein the state data further comprises a classification associated with the object, and wherein determining the perturbed trajectory is based at least in part on the classification associated with the object.

K. The method of any one of paragraphs F-J, further comprising: determining a probability associated with the perturbed trajectory; altering, based at least in part on the probability, the likelihood of collision; and determining, further based at least in part on the probability, the action for the vehicle.

L. The method of any one of paragraphs F-K, wherein determining the intersection comprises: determining a first bounding box associated with the vehicle; determining a second bounding box associated with the object; determining a first position of the first bounding box at the second time, based at least in part on the trajectory; determining a second position of the second bounding box at the second time, based at least in part on the perturbed trajectory; and determining an overlap between the first bounding box and the second bounding box at the second time, based at least in part on the first position and the second position.

M. The method of any one of paragraphs F-L, wherein the state data is based at least in part on sensor data captured by a sensor of the vehicle, and wherein the state data comprises acceleration data associated with the object and a steering angle rate associated with the object, and wherein determining the perturbed trajectory comprises varying one or more of the acceleration data or the steering angle rate, based at least in part on a perturbation parameter.

N. One or more non-transitory computer-readable media storing instructions executable by a processor, wherein the instructions, when executed, cause the processor to perform operations comprising: receiving state data associated with an object in an environment; receiving a perceived trajectory associated with the object; determining, based at least in part on the perceived trajectory, a perturbed trajectory; receiving a trajectory associated with a vehicle in the environment; determining, based at least in part on the perturbed trajectory and the trajectory, a likelihood of collision between the object and the vehicle; and determining, based at least in part on the likelihood of collision, an action for the vehicle.

O. The one or more non-transitory computer-readable media of paragraph N, wherein determining the perturbed trajectory comprises determining a plurality of perturbed trajectories, the operations further comprising: determining, based at least in part on the plurality of perturbed trajectories and the trajectory, a number of potential collisions between the vehicle and the object; determining that the number of potential collisions meets or exceeds a threshold number; and determining, further based at least in part on the number of potential collisions, the action for the vehicle.

P. The one or more non-transitory computer-readable media any one of paragraphs N-O, the operations further comprising: determining a probability of a collision between the vehicle and the object, based at least in part on the number of potential collisions relative to a number of the plurality of perturbed trajectories.

Q. The one or more non-transitory computer-readable media of any one of paragraphs N-P, wherein the state data comprises acceleration data associated with the object, a steering angle rate associated with the object, and wherein determining the plurality of perturbed trajectories associated with the object comprises varying at least one of the acceleration data or the steering angle rate.

R. The one or more non-transitory computer-readable media of any one of paragraphs N-Q, wherein the state data further comprises a classification associated with the object, and wherein determining the perturbed trajectory is based at least in part on the classification associated with the object.

S. The one or more non-transitory computer-readable media of any one of paragraphs N-R, the operations further comprising: determining a probability associated with the perturbed trajectory; altering, based at least in part on the probability, the likelihood of collision; and determining, further based at least in part on the probability, the action for the vehicle.

T. The one or more non-transitory computer-readable media of any one of paragraphs N-S, wherein determining the likelihood of collision between the object and the vehicle comprises: determining a first region associated with a predicted position of the vehicle at a first time, based at least in part on the trajectory; determining a second region associated with a predicted position of the object at the first time, based at least in part on the perturbed trajectory; and determining an overlap between the first region and the second region.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, components, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving state data associated with an object in an environment, the state data based at least in part on sensor data captured by a sensor of a vehicle, and the state data associated with a first time;
determining, based at least in part on the state data, a perceived trajectory associated with the object;
determining a plurality of perturbed trajectories associated with the object by performing a plurality of modifications of the perceived trajectory, based at least in part on an amount determined in accordance with a perturbation parameter;
determining, based at least in part on a first perturbed trajectory of the plurality of perturbed trajectories and a trajectory associated with the vehicle, an intersection associated with the object and the vehicle at a second time after the first time;
determining, based at least in part on the intersection, an action for the vehicle; and
controlling operation of the vehicle based at least in part on the action.

2. The system of claim 1, the operations further comprising:
determining, based at least in part on the plurality of perturbed trajectories and the trajectory associated with the vehicle, a number of intersections associated with the plurality of perturbed trajectories;
determining that the number of intersections meets or exceeds a threshold number; and
determining, further based at least in part on the number of intersections, the action for the vehicle.

3. The system of claim 2, the operations further comprising:
determining a probability associated with the first perturbed trajectory, the probability indicative of a likelihood for the object to follow the first perturbed trajectory; and
determining, further based at least in part on the probability and the number of intersections, the action for the vehicle.

4. The system of claim 1, wherein the state data comprises acceleration data associated with the object, a steering angle rate associated with the object, and a classification associated with the object,
wherein determining the first perturbed trajectory comprises varying at least one of the acceleration data or the steering angle rate, based at least in part on the perturbation parameter, and
wherein the perturbation parameter is based at least in part on the classification associated with the object.

5. The system of claim 1, wherein determining the intersection comprises:
determining a first region associated with the vehicle at the second time, based at least in part on the trajectory;
determining a second region associated with the object at the second time, based at least in part on the first perturbed trajectory; and
determining an overlap between the first region and the second region.

6. A method comprising:
- determining a perceived trajectory associated with an object in an environment;
- determining an amount by which to modify the perceived trajectory;
- determining a plurality of perturbed trajectories by modifying a parameter of the perceived trajectory by the amount;
- receiving a trajectory associated with a vehicle in the environment;
- determining, based at least in part on a first perturbed trajectory of the plurality of perturbed trajectories and the trajectory, a likelihood of collision between the object and the vehicle;
- determining, based at least in part on the likelihood of collision, an action for the vehicle; and
- controlling operation of the vehicle based at least in part on the action.

7. The method of claim 6, the method further comprising:
- determining, based at least in part on the plurality of perturbed trajectories and the trajectory, a number of potential collisions between the vehicle and the object;
- determining that the number of potential collisions meets or exceeds a threshold number; and
- determining, further based at least in part on the number of potential collisions, the action for the vehicle.

8. The method of claim 7, further comprising determining a probability of a collision between the vehicle and the object, based at least in part on the number of potential collisions relative to a number of the plurality of perturbed trajectories.

9. The method of claim 7, further comprising receiving acceleration data associated with the object, and a steering angle rate associated with the object, and
- wherein determining the plurality of perturbed trajectories associated with the object comprises varying at least one of the acceleration data or the steering angle rate.

10. The method of claim 9, further comprising receiving a classification associated with the object, and
- wherein determining the amount is based at least in part on the classification associated with the object.

11. The method of claim 6, further comprising:
- determining a probability associated with the first perturbed trajectory;
- altering, based at least in part on the probability, the likelihood of collision; and
- determining, further based at least in part on the probability, the action for the vehicle.

12. The method of claim 6, further comprising receiving state data associated with the object, wherein the state data is based at least in part on sensor data captured by a sensor of the vehicle, and wherein the state data comprises acceleration data associated with the object and a steering angle rate associated with the object, and
- wherein determining the first perturbed trajectory comprises varying one or more of the acceleration data or the steering angle rate.

13. The method of claim 6, wherein the parameter includes at least one of a velocity of the perceived trajectory, an acceleration of the perceived trajectory, or a steering angle of the perceived trajectory.

14. The method of claim 13, further comprising determining a second perturbed trajectory, wherein:
- determining the first perturbed trajectory comprises increasing the parameter of the perceived trajectory by the amount; and
- determining the second perturbed trajectory comprises decreasing the parameter of the perceived trajectory by the amount.

15. One or more non-transitory computer-readable media storing instructions executable by a processor, wherein the instructions, when executed, cause the processor to perform operations comprising:
- determining a perceived trajectory associated with an object in an environment;
- determining an amount by which to modify the perceived trajectory;
- determining a plurality of perturbed trajectories by modifying a parameter of the perceived trajectory by the amount;
- receiving a trajectory associated with a vehicle in the environment;
- determining, based at least in part on a first perturbed trajectory of the plurality of perturbed trajectories and the trajectory, a likelihood of collision between the object and the vehicle;
- determining, based at least in part on the likelihood of collision, an action for the vehicle; and
- controlling operation of the vehicle based at least in part on the action.

16. The one or more non-transitory computer-readable media of claim 15, the operations further comprising:
- determining, based at least in part on the plurality of perturbed trajectories and the trajectory, a number of potential collisions between the vehicle and the object;
- determining that the number of potential collisions meets or exceeds a threshold number; and
- determining, further based at least in part on the number of potential collisions, the action for the vehicle.

17. The one or more non-transitory computer-readable media of claim 16, the operations further comprising:
- determining a probability of a collision between the vehicle and the object, based at least in part on the number of potential collisions relative to a number of the plurality of perturbed trajectories.

18. The one or more non-transitory computer-readable media of claim 16, the operations further comprising receiving acceleration data associated with the object, and a steering angle rate associated with the object, and
- wherein determining the plurality of perturbed trajectories associated with the object comprises varying at least one of the acceleration data or the steering angle rate.

19. The one or more non-transitory computer-readable media of claim 18, the operations further comprising receiving a classification associated with the object, and
- wherein determining the amount is based at least in part on the classification associated with the object.

20. The one or more non-transitory computer-readable media of claim 14, the operations further comprising:
- determining a probability associated with the first perturbed trajectory;
- altering, based at least in part on the probability, the likelihood of collision; and
- determining, further based at least in part on the probability, the action for the vehicle.

* * * * *